United States Patent
Nakajima

(10) Patent No.: US 10,134,356 B2
(45) Date of Patent: Nov. 20, 2018

(54) TRANSMISSION APPARATUS, METHOD OF TRANSMITTING IMAGE DATA WITH WIDE COLOR GAMUT, RECEPTION APPARATUS, METHOD OF RECEIVING IMAGE DATA WITH COLOR GAMUT

(71) Applicant: SONY CORPORATION, Tokyo (JP)

(72) Inventor: Yasuhisa Nakajima, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/035,269

(22) PCT Filed: Nov. 19, 2014

(86) PCT No.: PCT/JP2014/005796
§ 371 (c)(1),
(2) Date: May 9, 2016

(87) PCT Pub. No.: WO2015/079655
PCT Pub. Date: Jun. 4, 2015

(65) Prior Publication Data
US 2016/0293135 A1    Oct. 6, 2016

(30) Foreign Application Priority Data
Nov. 28, 2013   (JP) ................. 2013-246799

(51) Int. Cl.
*G09G 5/00*   (2006.01)
*G09G 5/02*   (2006.01)
*H04N 11/20*  (2006.01)

(52) U.S. Cl.
CPC ............... *G09G 5/006* (2013.01); *G09G 5/02* (2013.01); *H04N 11/20* (2013.01);
(Continued)

(58) Field of Classification Search
CPC ........... G09G 5/006; G09G 5/02; H04N 11/20
(Continued)

(56) References Cited

U.S. PATENT DOCUMENTS 9,838,639 B2 * 12/2017 Sasazaki ................. H04N 5/38
2008/0120674 A1 * 5/2008 Suzuki .................. G06T 1/0028
725/118
(Continued)

FOREIGN PATENT DOCUMENTS

EP    2023632 A    2/2009
EP    2023632 A1   2/2009
(Continued)

OTHER PUBLICATIONS

Office Action for JP Patent Application No. 2013-246799, dated Feb. 21, 2017, 07 pages of Office Action.
(Continued)

*Primary Examiner* — Mishawn N Hunter
(74) *Attorney, Agent, or Firm* — Chip Law Group

(57) ABSTRACT

A transmission apparatus includes a data transmission unit that transmits image data with a wide color gamut to an external apparatus over a transmission path; and an information transmission unit that transmits additional information on the image data with the wide color gamut that is transmitted by the data transmission unit and information on a transmission method for the additional information, to the external apparatus over the transmission path.

21 Claims, 18 Drawing Sheets

(52) U.S. Cl.
CPC ..... *G09G 2370/04* (2013.01); *G09G 2370/10* (2013.01); *G09G 2370/12* (2013.01)

(58) Field of Classification Search
USPC ........................................ 386/200, 231, 245
See application file for complete search history.

(56) References Cited

U.S. PATENT DOCUMENTS

| | | | | |
|---|---|---|---|---|
| 2008/0151119 | A1* | 6/2008 | Suzuki | H04N 5/775 348/569 |
| 2010/0039443 | A1* | 2/2010 | Mizukura | H04N 1/6058 345/590 |
| 2011/0064373 | A1* | 3/2011 | Doser | G11B 27/031 386/201 |
| 2011/0128438 | A1* | 6/2011 | Yamashita | G06T 1/00 348/384.1 |
| 2012/0281069 | A1* | 11/2012 | Nishio | H04N 13/0048 348/43 |
| 2012/0307913 | A1* | 12/2012 | Hirano | H04N 21/2187 375/240.25 |

FOREIGN PATENT DOCUMENTS

| | | |
|---|---|---|
| EP | 2151988 A | 2/2010 |
| JP | 2005-514873 A | 5/2005 |
| JP | 422533 B | 2/2009 |
| JP | 2010-041636 A | 2/2010 |
| JP | 2011-508245 A | 3/2011 |
| JP | 2011-511545 A | 4/2011 |
| JP | 2013-538528 A | 10/2013 |
| JP | 2013-229685 A | 11/2013 |
| JP | 2013-229885 A | 11/2013 |
| WO | 03/058826 A | 7/2003 |
| WO | 2012/036947 A | 3/2012 |
| WO | 2013/076881 A1 | 5/2013 |

OTHER PUBLICATIONS

Office Action for JP Patent Application No. 2013-246799, dated Jul. 4, 2017, 05 pages of Office Action and 03 pages of English Translation.

Hitachi Ltd., et al., "High-Definition Multimedia Interface", Version 1.3a, Nov. 10, 2006, 15 pages.

* cited by examiner

[Fig. 1]
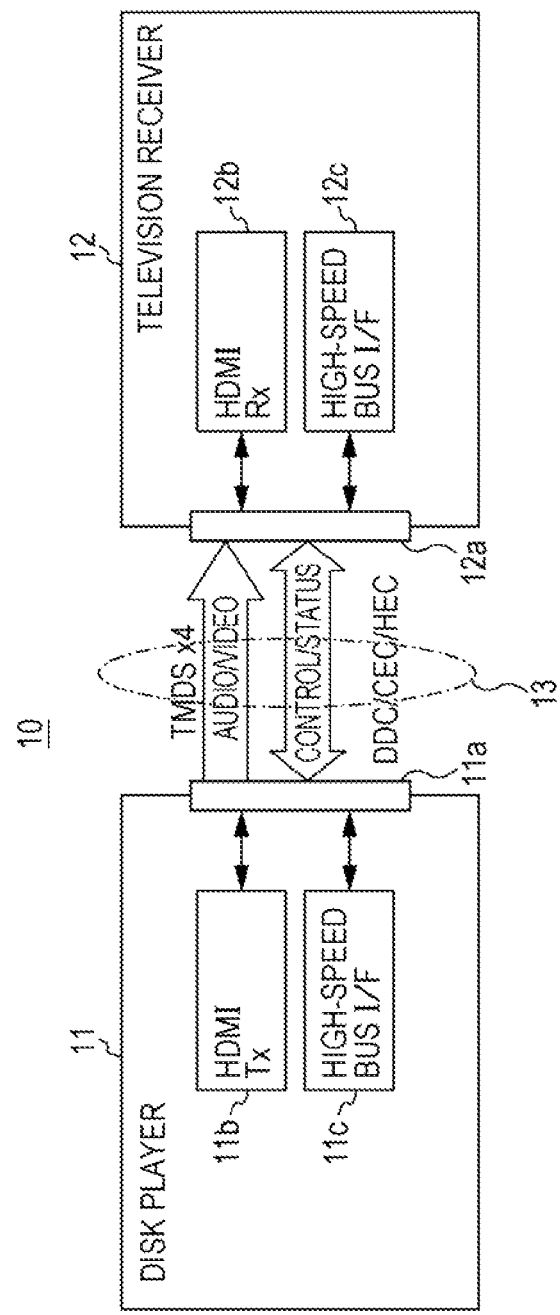

[Fig. 2]
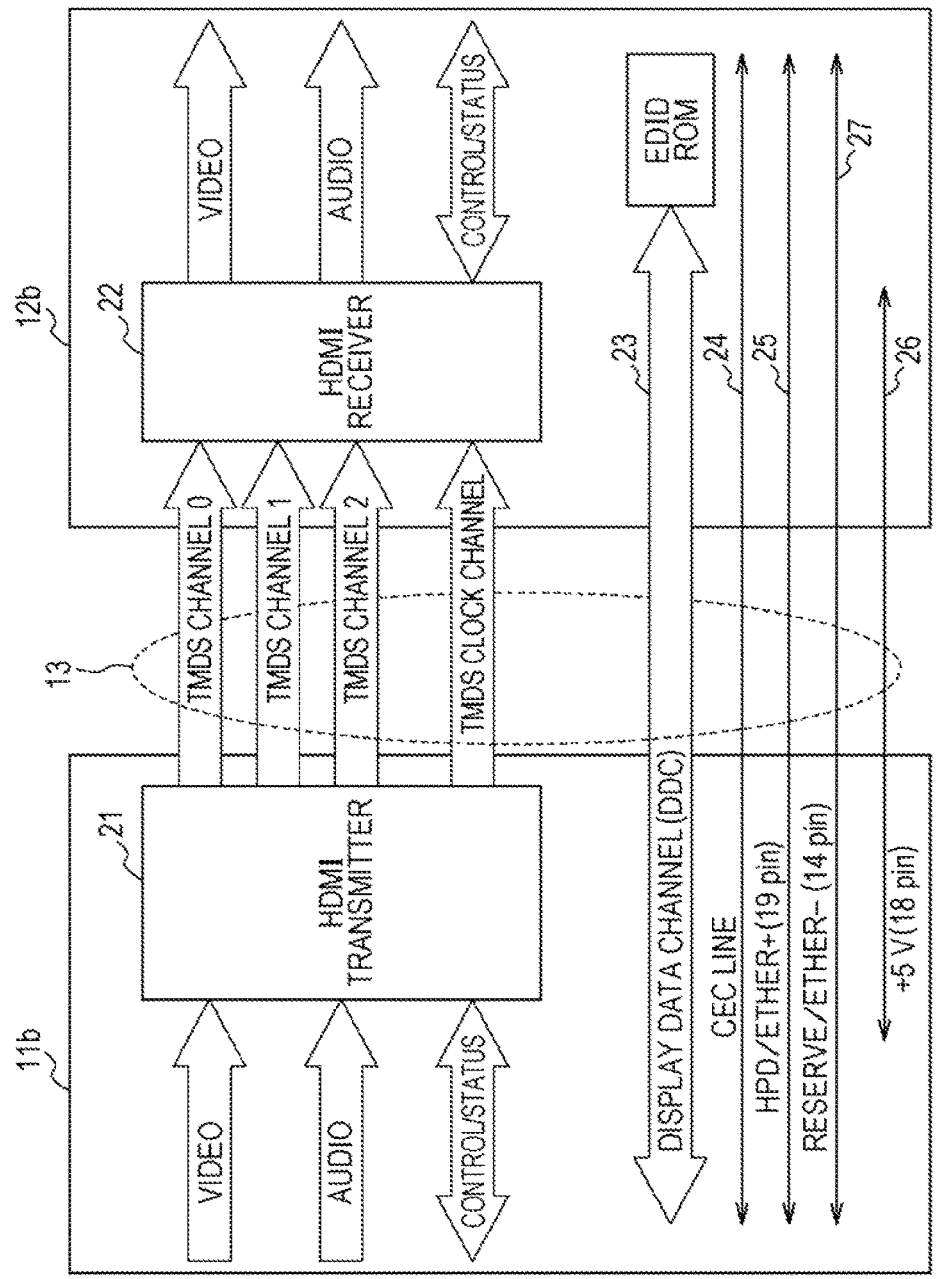

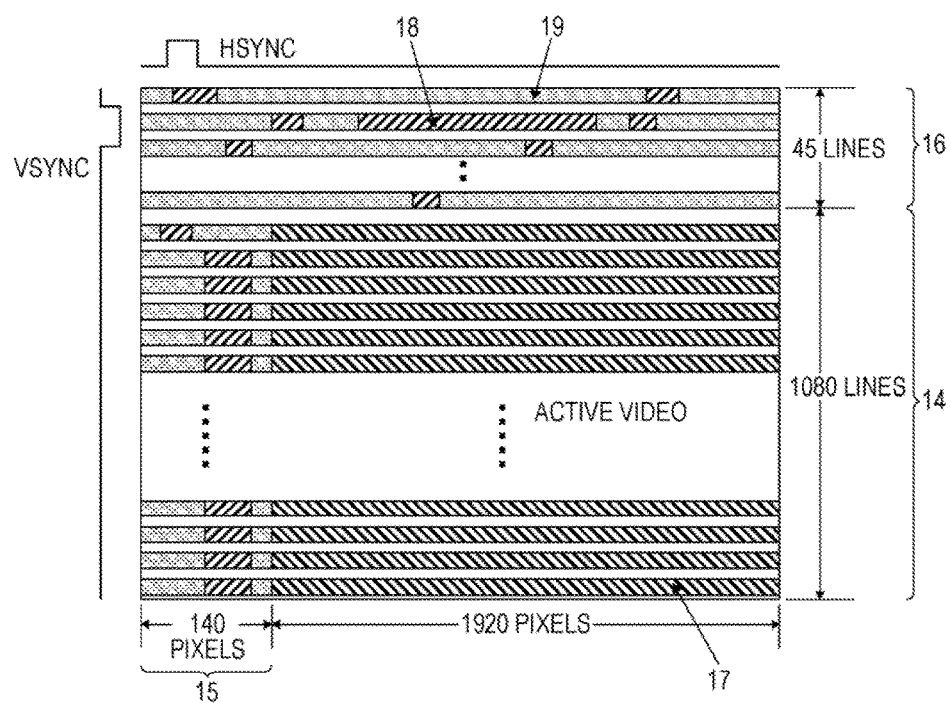
[Fig. 3]

[Fig. 4]
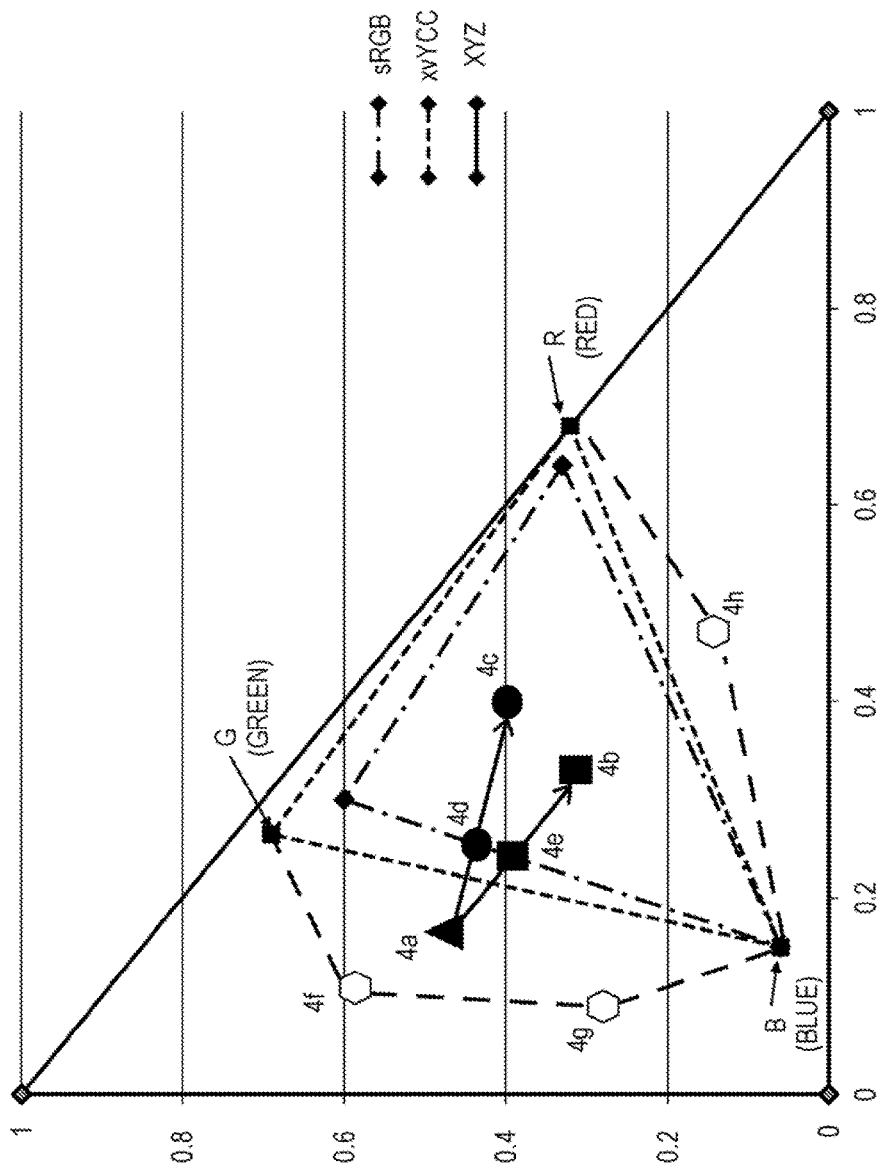

[Fig. 5]
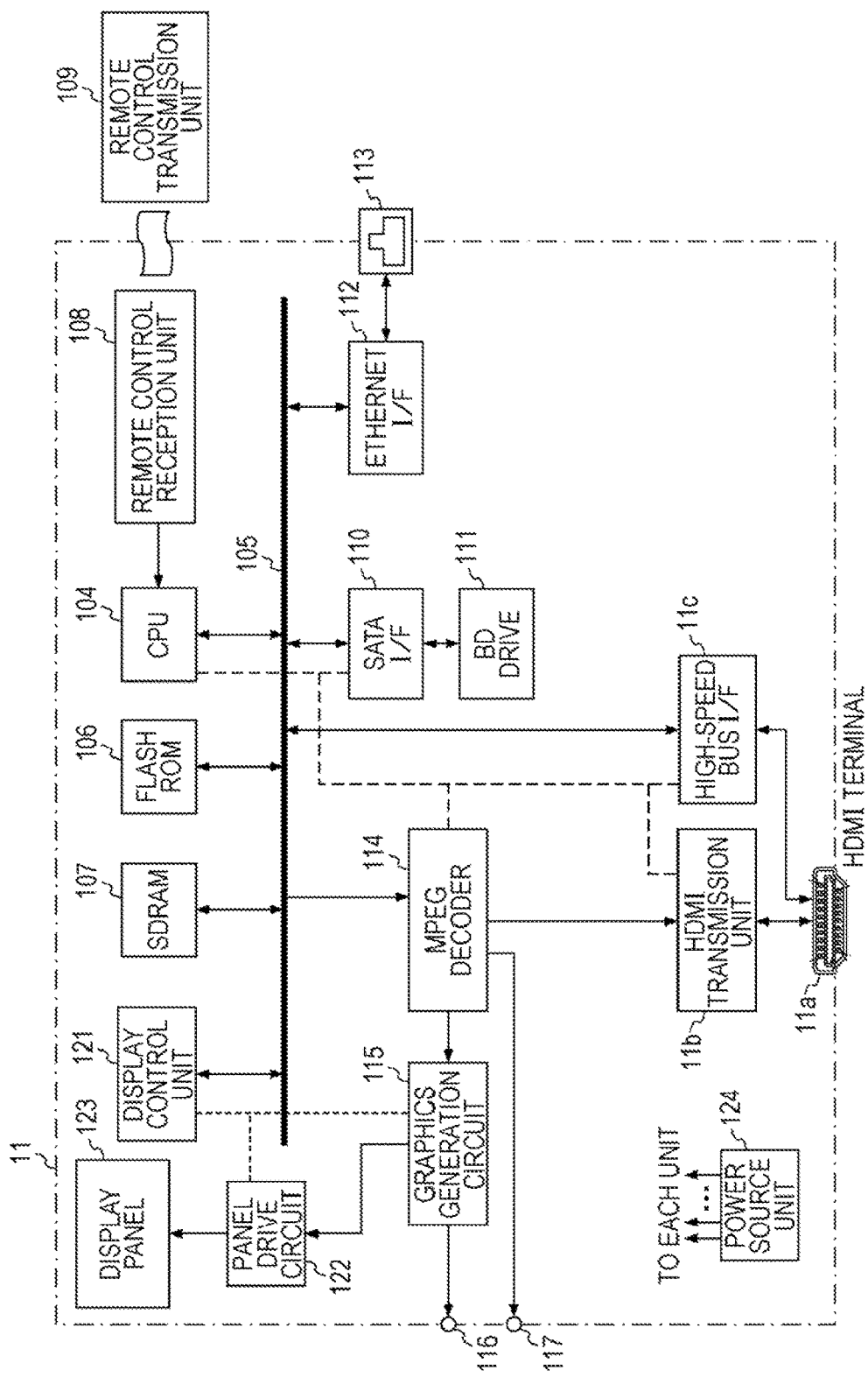

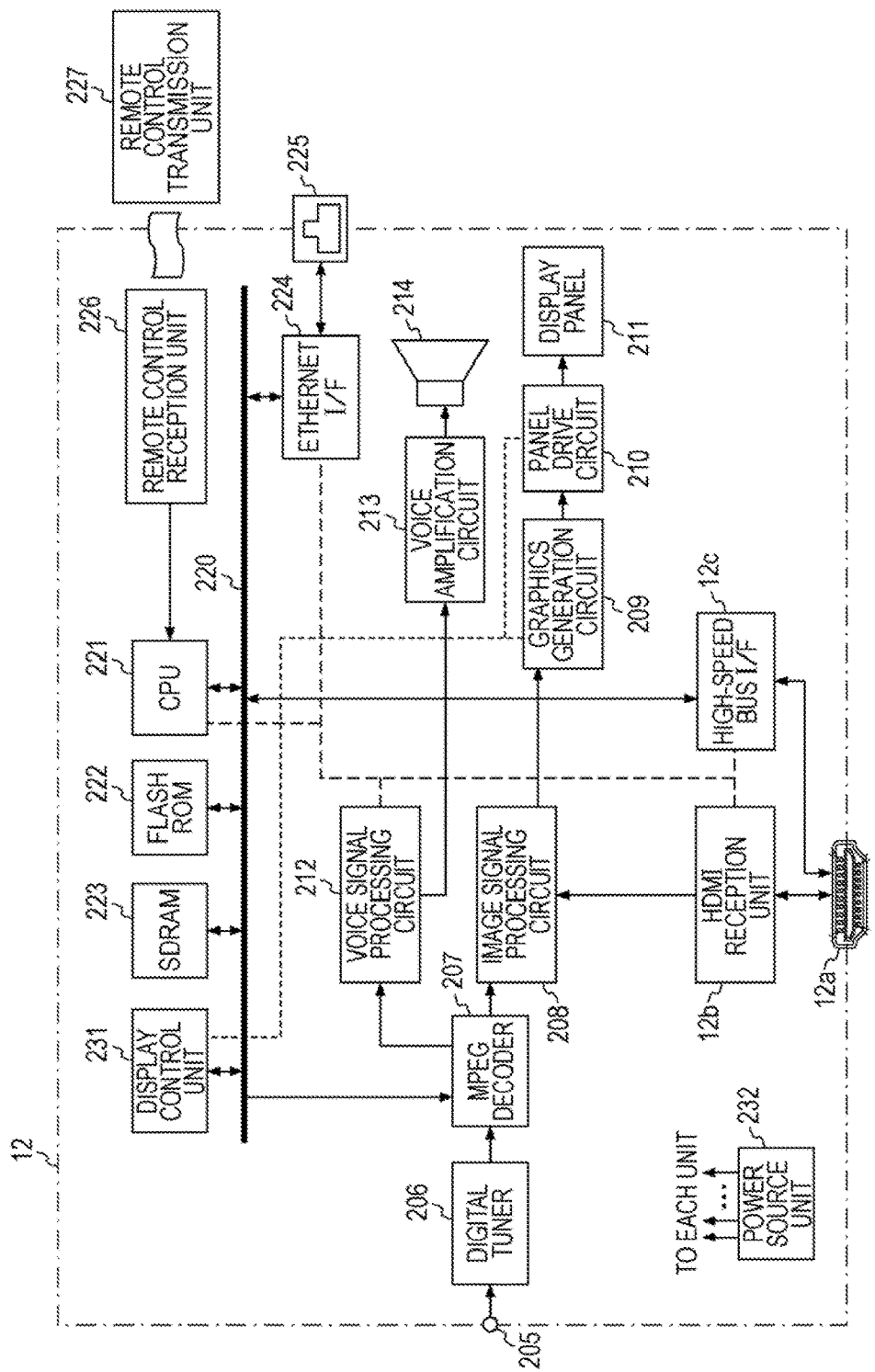
[Fig. 6]

[Fig. 7]
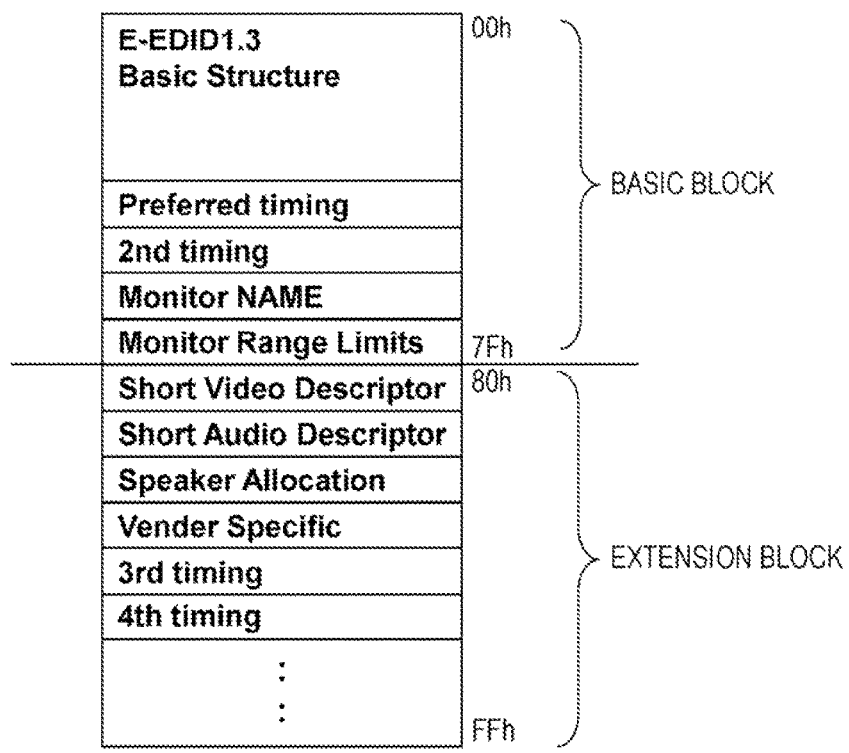

[Fig. 8]

| Byte# | 7 | 6 | 5 | 4 | 3 | 2 | 1 | 0 |
|---|---|---|---|---|---|---|---|---|
| 0 | Vendor-specific tag code (=3) | | | | Length (=N) | | | |
| 1...3 | 24bit IEEE Registration Identifier (0x000C03) LSB first | | | | | | | |
| 4 | A | | | | B | | | |
| 5 | C | | | | D | | | |
| 6 | Supports-AI | DC_48bit | DC_36bit | DC_30bit | DC_Y444 | Reserved (0) | | DVI_Dual |
| 7 | Max_TMDS_Clock | | | | | | | |
| 8 | Latency_Fields_Present | I_Latency_Fields_Present | HDMI_Video_Present | WCG Extension | CNC3 | CNC2 | CNC1 | CNC0 |
| (9) | Video_Latency | | | | | | | |
| (10) | Audio_Latency | | | | | | | |
| (11) | Interlaced_Video_Latency | | | | | | | |
| (12) | Interlaced_Audio_Latency | | | | | | | |
| (13) | 3D_Present | Reserved (0) | | | | | | |
| (14) | HDMI_VIC_LEN | | | HDMI_3D_LEN | | | | |
| (15) | (if HDMI_VIC_LEN>0) HDMI_VIC_1 | | | | | | | |
| ... | | | | | | | | |
| (15+M-1) | | | | | | | | |
| 15+M | GBD | VSIF | AVIF | HEC | HDMI_VIC_M | | Reserved (0) | |
| 16+M...N | Reserved (0) | | | | | | | |

[Fig. 9]

| Byte# | 7 | 6 | 5 | 4 | 3 | 2 | 1 | 0 |
|---|---|---|---|---|---|---|---|---|
| 0 | Checksum ||||||||
| 1...3 | 24bit IEEE Registration Identifier (0x000C03) LSB first ||||||||
| 4 | HDMI_Video_Format | WCG_Format | WCG_Type |||||||
| (5) | 3D_Structure |||| Reserved (0) ||||
| (6) | 3D_Ext_Data |||| 3D_Meta_present | Reserved (0) |||
| (7) | 3D_Metadata_type ||| 3D_Metadata_Length (=N) |||||
| (8) | 3D_Metadata_1 ||||||||
| ... | ... ||||||||
| (7+N) | 3D_Metadata_N ||||||||
| (8+N)...(9+N) | X_Vector_White ||||||||
| (10+N)...(11+N) | Y_Vector_White ||||||||
| (12+N)...(13+N) | Luminance_White_Value ||||||||
| (14+N) | Number_Vertices (M) ||||||||
| (15+N)...(16+N) | X_Vector_1 ||||||||
| (17+N)...(18+N) | Y_Vector_1 ||||||||
| ... | ... ||||||||
| (15+N+2*M)...(16+N+2*M) | X_Vector_M ||||||||
| (17+N)+2*M...(18+N+2*M) | Y_Vector_M ||||||||

[Fig. 10]

| Byte# | 7 | 6 | 5 | 4 | 3 | 2 | 1 | 0 |
|---|---|---|---|---|---|---|---|---|
| ... | ... | ... | ... | ... | ... | ... | ... | ... |
| 8+2*(N-1) | Integer (b1-b0) | | | | Reserved (0) | | | Fraction (b8) |
| 9+2*(N-1) | Fraction (b7-b0) | | | | | | | |
| ... | ... | ... | ... | ... | ... | ... | ... | ... |

[Fig. 11]

| Byte# | 7 | 6 | 5 | 4 | 3 | 2 | 1 | 0 |
|---|---|---|---|---|---|---|---|---|
| 0 | Format_Flag | Facet_Mode | Rsv (0) | GBD_Color_Precision | GBD_Color_Space | | | |
| 1..2 | X_Vector_White | | | | | | | |
| 3..4 | Y_Vector_White | | | | | | | |
| 5 | Number_Vertices (N>=3) | | | | | | | |
| 6..7 | X_Vector_1 | | | | | | | |
| 8..9 | Y_Vector_1 | | | | | | | |
| ... | ... | | | | | | | |
| 8+2*(N-1)...9+2*(N-1) | X_Vector_N | | | | | | | |
| 10+2*(N-1)...11+2*(N-1) | Y_Vector_N | | | | | | | |

[Fig. 12]
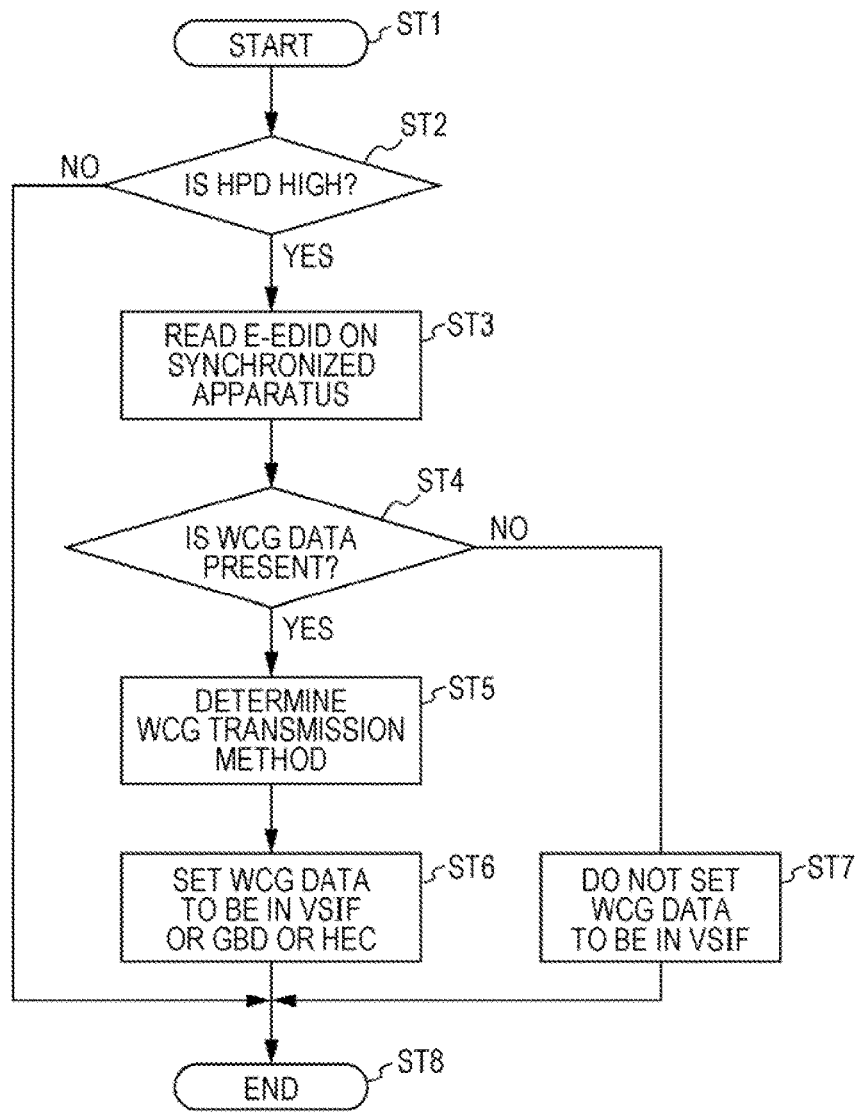

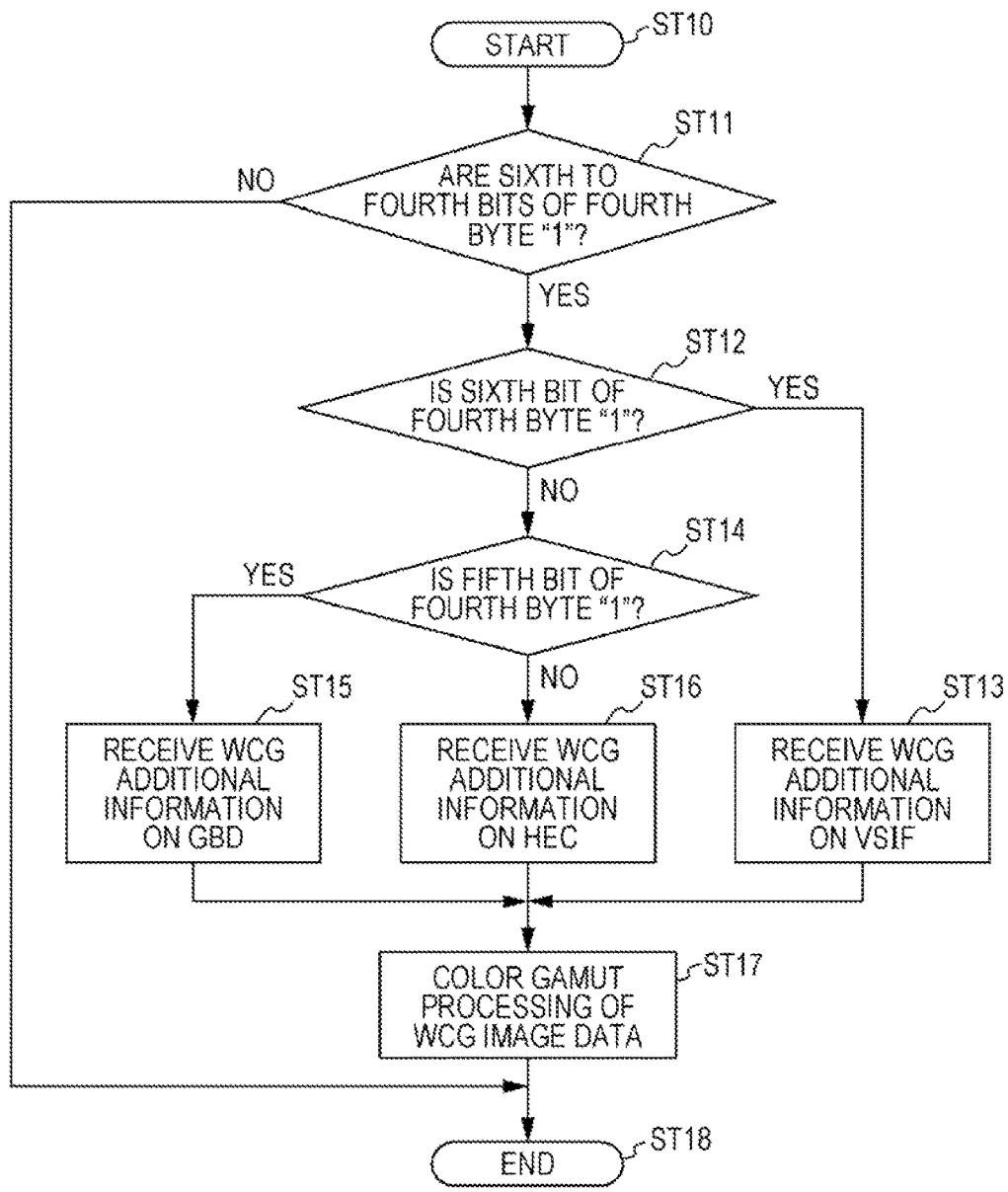
[Fig. 13]

[Fig. 14]
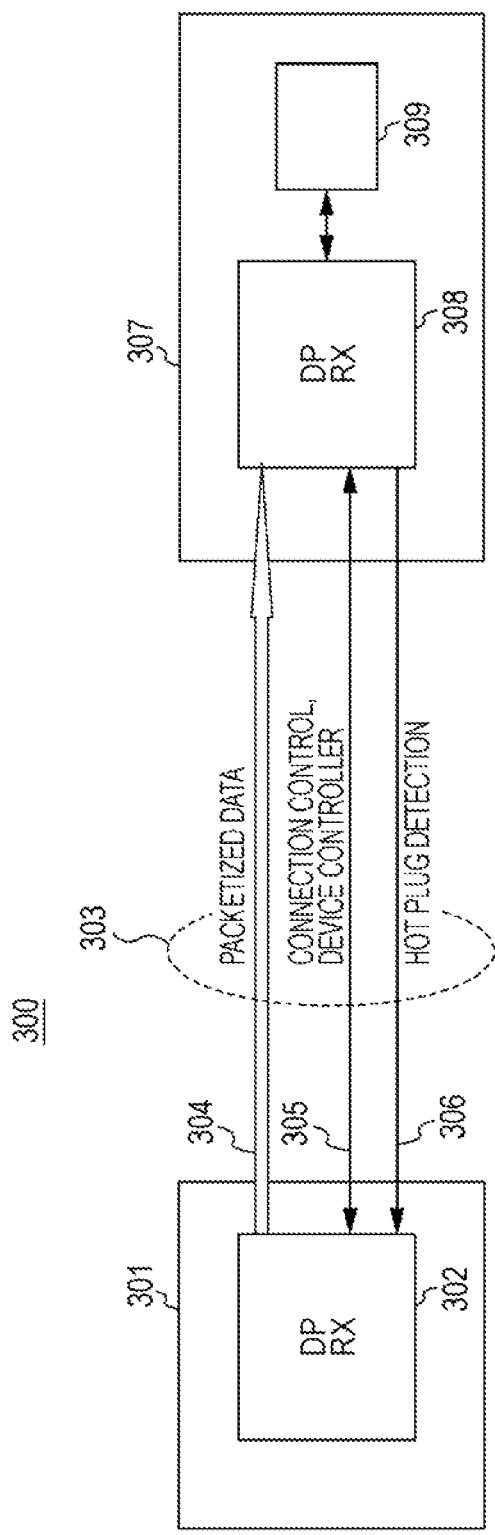

[Fig. 15]
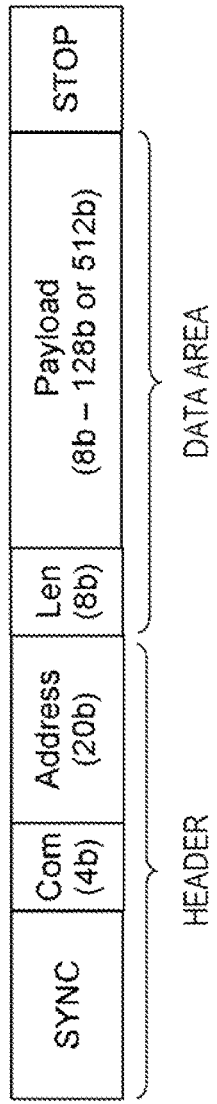

[Fig. 16]
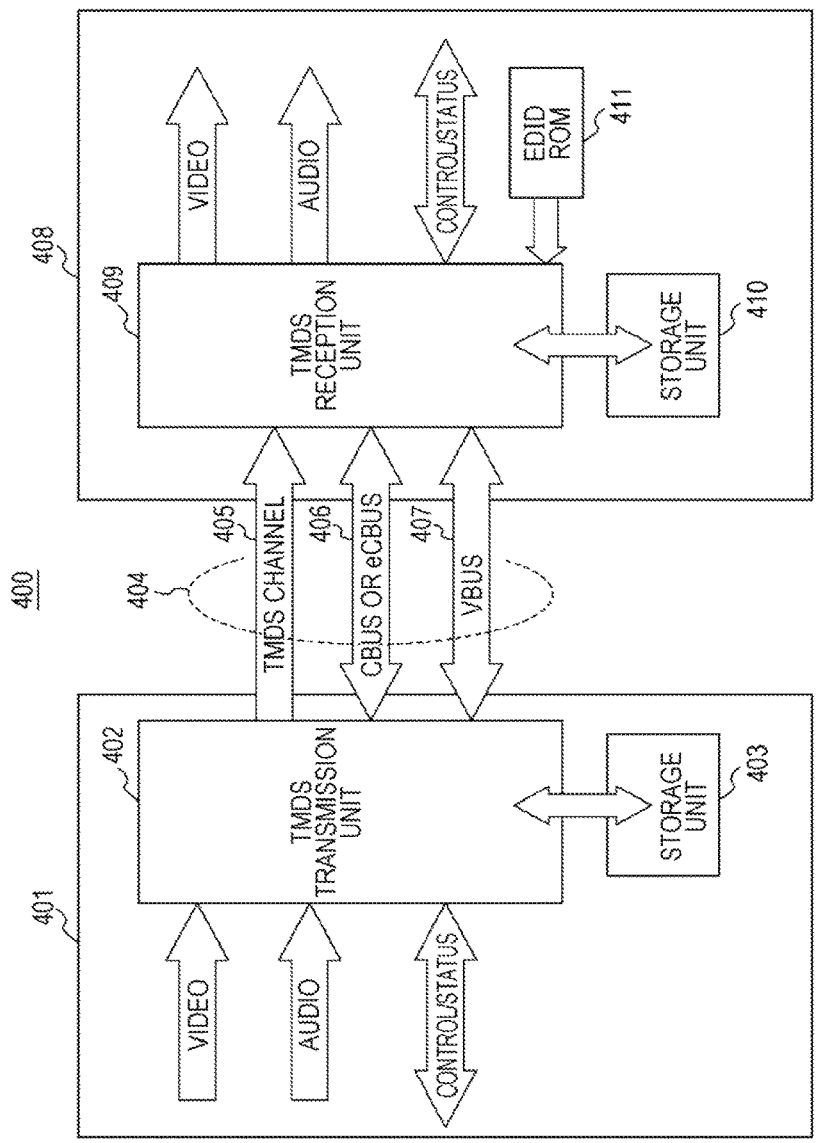
[Fig. 17]
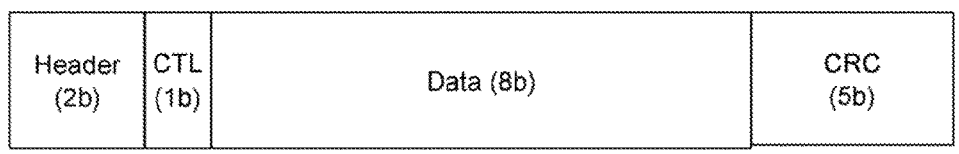

[Fig. 18]

CBUS PACKET FORMAT

| Request_Command (0xFF) | Null | START | Payload (256Byte) | CRC | Null |
|---|---|---|---|---|---|

EXAMPLE OF DATA STRUCTURE OF INFORMATION ON TRANSMISSION METHOD AND INFORMATION ON GAMMA CORRECTION USING PACKET CBUS 406

| | Descriptor |
|---|---|
| Metadata_tx{ | |
| Reserved | u(1) |
| Metadata_type | u(7) |
| Metadata_length(n) | u(8) |
| Metadata | u(v) |
| } | |

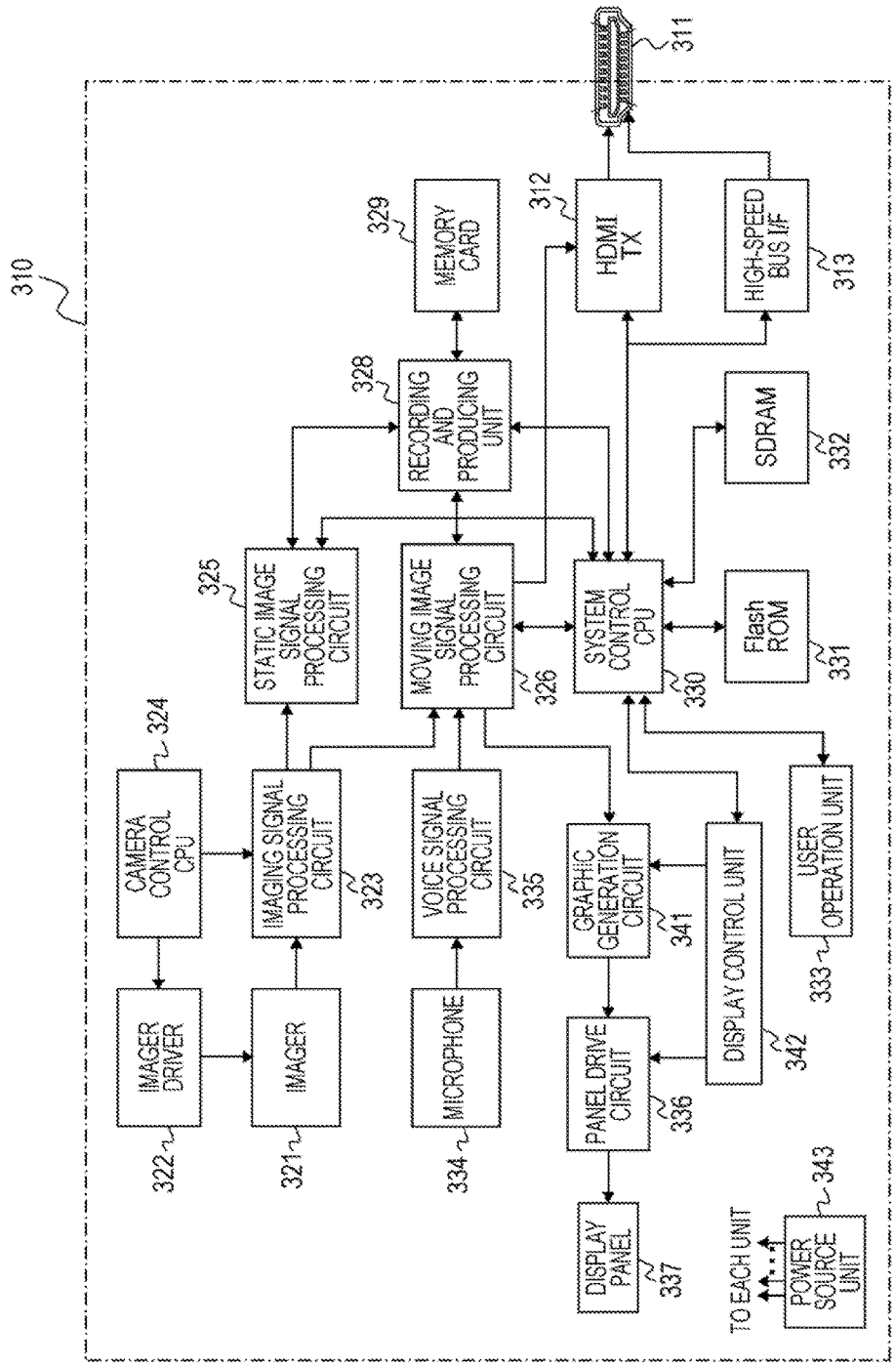
[Fig. 19]

TRANSMISSION APPARATUS, METHOD OF TRANSMITTING IMAGE DATA WITH WIDE COLOR GAMUT, RECEPTION APPARATUS, METHOD OF RECEIVING IMAGE DATA WITH COLOR GAMUT

CROSS REFERENCE TO RELATED APPLICATIONS

This application is a U.S. National Phase of International Patent Application No. PCT/JP2014/005796 filed on Nov. 19, 2014, which claims the benefit of Japanese Patent Application No. JP 2013-246799 filed in the Japan Patent Office on Nov. 28, 2013. Each of the above-referenced applications is hereby incorporated herein by reference in its entirety.

TECHNICAL FIELD

The present disclosure relates to a transmission apparatus, a method of transmitting image data with a wide color gamut, a reception apparatus, a method of receiving the image data with the wide color gamut, and a program, and more particularly to a transmission apparatus and the like that transmit image data with a wide color gamut such as image data with a wide color gamut.

BACKGROUND ART

In recent years, for example, a High Definition Multimedia Interface (HDMI) has spread as a communication interface through which a digital picture signal, that is, a non-compressed (baseband) picture signal (image data) and a digital voice signal (voice data) accompanying the picture signal, is transmitted at a high speed from a Digital Versatile Disc (DVD) recorder, a set-top box, or another Audio Visual (AV) Source to a television receiver, a projector, or other displays. "HDMI" is a registered trademark.

For example, an AV system and the like are considered in which a disk player as a source apparatus and a television receiver as a synchronized apparatus are HDMI-connected to each other, but the image data recorded on the disk player is color-adjusted within a color gamut that is fixed for every image format, with the assumption that the image data is displayed on a display apparatus.

On the other hand, the color gamut of the display apparatus is sRGB, xvYCC, or the like, which is a comparatively narrow color gamut. For this reason, the color gamut of an original image is reproduced, by image signal processing by the display apparatus, as a color gamut that does not reflect an image producer's intention.

Accordingly, a Wide Color Gamut (WCG), which results from color gamut processing that extends a color gamut to which the image data is fixed for every image format, is proposed and has been extended in practice in post processing. For example, in PTL 1, a proposal for operability between a display and a DVD player in setting a color space (color gamut) is disclosed.

CITATION LIST

Patent Literature

[PTL 1]: Japanese Patent No. 422533

SUMMARY

Technical Problem

In the related art, transmission specifications for image data with a wide color gamut in digital interfaces such as HDMI, have been proposed. However, only chromaticity information on 3 RGB points has been specified, and thus it is difficult to support assignment of a color gamut that lies out of this color gamut.

It is desirable to enable transmission of image data with a wide color gamut to be satisfactorily performed.

Solution to Problem

A conception of the present technology lies in a transmission apparatus including: a data transmission unit that transmits image data with a wide color gamut to an external apparatus over a transmission path; and an information transmission unit that transmits additional information on the image data with the wide color gamut that is transmitted by the data transmission unit and information on a transmission method for the additional information, to the external apparatus over the transmission path.

In the present technology, the image data with the wide color gamut is transmitted by the data transmission unit to the external apparatus over the transmission path. For example, the data transmission unit may transmit the image data with the wide color gamut to the external apparatus over the transmission path using a differential signal.

The additional information on the image data with the wide color gamut that is transmitted by the data transmission unit and the information on the transmission method for the additional information are transmitted by the information transmission unit to the external apparatus over the transmission path. For example, the additional information on the image data with the wide color gamut may include at least one among luminance level information on a white chromaticity point of the image data with the wide color gamut, a vector value of the white chromaticity point in an XYZ coordinate system, a vector value of an RGB chromaticity point in the XYZ coordinate system, and vector values of one or more chromaticity points that lie out of RGB, in the XYZ coordinate system.

For example, the information transmission unit may insert the information on the transmission method for the additional information on the image data with the wide color gamut that is transmitted from the data transmission unit, during a blanking period of the image data with the wide color gamut, and may transmit the inserted information to the external apparatus. Furthermore, the information transmission unit may insert the additional information on the image data with the wide color gamut that is transmitted from the data transmission unit, during the blanking period of the image data with the wide color gamut, and thus may transmit the inserted additional information to the external apparatus.

Furthermore, the information transmission unit may transmit the additional information on the image data with the wide color gamut that is transmitted from the data transmission unit, to the external apparatus over a bidirectional communication path that is configured from a line of the transmission path. Then, in this case, the bidirectional communication path may be a pair of differential transmission paths, and at least one of the differential transmission paths in the pair may have a function of receiving a connection state notification from the external apparatus using direct-current bias potential.

In this manner, in the present technology, the image with the wide color gamut is transmitted to the external apparatus over the transmission path, the additional information on the image data with the wide color gamut and the information on the transmission method for the additional information are transmitted to the external apparatus over the same transmission path, and thus the transmission of the image data with the wide color gamut can be satisfactorily performed.

Moreover, in the present technology, for example, a transmission method information reception unit that receives the information on the transmission method for the additional information on the image data with the wide color gamut that is transmitted by the external apparatus over the transmission path and that the external apparatus is able to support, and a transmission method selection unit that selects a transmission method from among the transmission methods for the additional information on the image data with the wide color gamut that the external apparatus is able to support, based on the information on the transmission method that is received by the transmission method information reception unit may be further included, in which the information transmission unit may transmit the additional information on the image data with the wide color gamut over the transmission path using the transmission method that is selected by the transmission method selection unit. In this case, the external apparatus can reliably receive the additional information on the image data with the wide color gamut.

Furthermore, another concept of the present technology lies in a reception apparatus including: a data reception unit that receives image data with a wide color gamut for displaying an image with the wide color gamut from an external apparatus over a transmission path; an information reception unit that receives information on a transmission method for additional information on the image data with the wide color gamut that is received by the data reception unit, and that receives the additional information on the image data with the wide color gamut based on the information on the transmission method from the external apparatus; and a data processing unit that processes the image data with the wide color gamut that is received by the data reception unit, using the additional information on the image data with the wide color gamut that is received by the information reception unit.

In the present technology, the image data with the wide color gamut for displaying the image with the wide gamut is received by the data reception unit from the external apparatus over the transmission path. For example, the data reception unit may receive the image data with the wide color gamut from the external apparatus over the transmission path using a differential signal.

The information reception unit receives the information on the transmission method for the additional information on the image data with the wide color gamut that is received by the data reception unit, and receives the additional information on the image data with the wide color gamut based on the information on the transmission method from the external apparatus. Then, the data processing unit processes the image data with the wide color gamut that is received by the data reception unit, by using the additional information on the image data with the wide color gamut that is received by the information reception unit.

For example, the information reception unit may extract the information on the transmission method for the additional information on the image data with the wide color gamut from a blanking period of the image data with the wide color gamut that is received by the data reception unit. Furthermore, for example, the information reception unit may extract the additional information on the image data with the wide color gamut from a blanking period of the image data with the wide color gamut that is received by the data reception unit.

Furthermore, for example, the information reception unit may receive the additional information on the image data with the wide color gamut that is received by the data reception unit, from the external apparatus over a bidirectional communication path that is configured from a line of the transmission path. Then, in this case, the bidirectional communication path may be a pair of differential communication paths, and at least one of the differential communications paths in the pair may have a function of notifying the external apparatus of a connection state using direct-current bias potential.

In the present technology, in this manner, the image data with the wide color gamut that is transmitted from a transmitting side is processed based on the additional information on the image data with the wide color gamut that is transmitted in the same manner from the transmitting side, and thus proper processing can be easily performed on the received image data with the wide color gamut.

Moreover, in the present technology, a transmission method information storage unit in which the information on the transmission method for the additional information on the image data with the wide color gamut that the transmission method information storage unit itself is able to support is stored, and a transmission method information transmission unit that transmits the information on the transmission method that is stored in the transmission method information storage unit may be further included. For example, the information on the transmission method that is stored in the transmission method information storage unit may be at least one among GBD packet information, VSIF packet information, AVIF packet information, and HEC packet information. In this manner, the information on the transmission method for the additional information on the image data with the wide color gamut that the reception apparatus itself can support is transmitted to the transmitting side, and thus the additional information on the image data with the wide color gamut can be received, in accordance with the transmission method that the reception apparatus can support, from the transmitting side.

Advantageous Effects of Invention

According to the present disclosure, the transmission of the image data with the wide color gamut can be satisfactorily performed. Moreover, effects described in the present specification are merely examples and thus are not limited to these examples, and additional effects may be present.

BRIEF DESCRIPTION OF DRAWINGS

FIG. 1 is a block diagram illustrating a configuration example of an AV system according to an embodiment.

FIG. 2 is a block diagram illustrating a configuration example of an HDMI transmission unit of a disk player and of an HDMI reception unit of a television receiver.

FIG. 3 is a diagram illustrating various transmission data periods that are present when image data of 1,920 rows of pixels and 1,080 lines in columns is transmitted in the TMDS channels #0, #1, and #2.

FIG. 4 is a conceptual diagram illustrating a color gamut of each of sRGB, xvYCC, and XYZ in the related art.

FIG. 5 is a block diagram illustrating a configuration example of the disk player (source apparatus) that makes up an AV system.

FIG. 6 is a block diagram illustrating a configuration example of the television receiver (synchronized apparatus) that makes up the AV system.

FIG. 7 is a diagram illustrating an example of a data structure of E-EDID that is stored in the synchronized apparatus (television receiver).

FIG. 8 is a diagram illustrating an example of a data structure of a Vender Specific region of the E-EDID.

FIG. 9 is a diagram illustrating an example of a data structure of a Vendor Specific InfoFrame packet of HDMI.

FIG. 10 is a diagram for describing additional information on the image data with a wide color gamut that is transmitted with the Vendor Specific InfoFrame packet.

FIG. 11 is a diagram illustrating an example of a data structure of a Gamut Boundary Data (GBD) packet of the HDMI.

FIG. 12 is a flow chart for describing an example of processing by the disk player (source apparatus) at the time of connection to the television receiver (synchronized apparatus).

FIG. 13 is a flow chart for describing an example of processing by the television receiver (synchronized apparatus) at the time of starting to receive the WCG image data from the disk player (source apparatus).

FIG. 14 is a block diagram illustrating a configuration example of a DP reception unit of a PC and a transmission unit of the television receiver.

FIG. 15 is a diagram for describing an example of a data structure of an AUX channel of a DP and the additional information on the image data with the wide color gamut that is transmitted.

FIG. 16 is a block diagram illustrating a configuration example of an MHL transmission unit of a portable terminal and an MHL reception unit of the television receiver.

FIG. 17 is a diagram illustrating an example of a data structure of a CBUS of an MHL.

FIG. 18 is a diagram for describing an example of a data structure of the CBUS of the MHL and the additional information on the image data with the wide color gamut that is transmitted.

FIG. 19 is a block diagram illustrating a configuration example of a digital camera (source apparatus) which configures an AV system.

DESCRIPTION OF EMBODIMENTS

Embodiments for reduction to practice of the present disclosure (hereinafter referred to as "embodiments") are described below. Moreover, descriptions are provided in the following order.
1. Embodiments
2. Modification Example
(1. Embodiments)
(Configuration Example of an AV System)

FIG. 1 illustrates a configuration example of an audio visual (AV) system 10 according to an embodiment. The AV system 10 has a disk player 11 as a source apparatus, and a television receiver 12 as a synchronized apparatus. The disk player 11 and the television receiver 12 are connected to each other through an HDMI cable 13 as a transmission path.

An HDMI terminal 11a, to which an HDMI transmission unit (HDMITX) 11b and a high-speed bus interface (I/F) 11c are connected, is provided to the disk player 11. An HDMI terminal 12a, to which an HDMI reception unit (HDMI RX) 12b and a high-speed bus interface (I/F) 12c are connected, is provided to the television receiver 12. One end of the HDMI cable 13 is connected to the HDMI terminal 11a of the disk player 11, and the other end of HDMI cable 13 is connected to the HDMI terminal 12a of the television receiver 12.

In the AV system 10 illustrated in FIG. 1, non-compressed image data that is reproduced in the disk player 11 and thus is obtained is transmitted to the television receiver 12 through the HDMI cable 13, and an image that results from image data transmitted from the disk player 11 is displayed on the television receiver 12. Furthermore, the non-compressed voice data that is reproduced in the disk player 11 and thus is obtained is transmitted to the television receiver 12 through the HDMI cable 13, and a voice that results from voice data transmitted from the disk player 11 is output from the television receiver 12.

FIG. 2 illustrates a configuration example of the HDMI transmission unit 11b of the disk player 11 and of the HDMI reception unit 12b of the television receiver 12 in the AV system 10. During an effective screen period 14 (hereinafter referred to suitably as an active video period) (refer to FIG. 3), a period that results from excluding a horizontal blanking period 15 and a vertical blanking period 16 from a period from one vertical synchronization signal to the next vertical synchronization signal, the HDMI transmission unit 11b transmits, a differential signal that corresponds to non-compressed pixel data for an image for one screen, in one direction in multiple channels, to the HDMI reception unit 12b. Furthermore, during the horizontal blanking period 15 and the vertical blanking period 16, the HDMI transmission unit 11b transmits the differential signal that corresponds to voice data or control data accompanying at least an image, other items of auxiliary data, and the like, to the HDMI reception unit 12b in one direction in multiple channels.

That is, the HDMI transmission unit 11b has an HDMI transmitter 21. The HDMI transmitter 21, for example, converts non-compressed image pixel data into the corresponding differential signal, and serial-transfers the result of the conversion to the HDMI reception unit 12b in the multiple channels, three transition minimized differential signaling (TMDS) channels #0, #1, and #2, in one direction.

Furthermore, the HDMI transmitter 21 converts the voice data accompanying a non-compressed image, the necessary control data, other items of auxiliary data, and the like into the corresponding differential signal and serial-transfers the result of the conversion to the HDMI reception unit 12b in one direction in the three TMDS channels #0, #1, and #2. Additionally, the HDMI transmitter 21 transmits a pixel clock that is synchronized with the pixel data that is transmitted in the three TMDS channels #0, #1, and #2, to the HDMI reception unit 12b in a TMDS clock channel. At this point, 10-bit pixel data is transmitted in one clock in terms of the pixel clock in one TMDS channel #i (i=0, 1, 2).

During the active video period 14 (refer to FIG. 3), the HDMI reception unit 12b receives the differential signal that is transmitted in one direction from the HDMI transmission unit 11b, and that corresponds to the pixel data, in the multiple channels. Furthermore, during the horizontal blanking period 15 (refer to FIG. 3) or the vertical blanking period 16 (refer to FIG. 3), the HDMI reception unit 12b receives the differential signal that is received in one direction from the HDMI transmission unit 11b, and that corresponds to the voice data or the control data, in the multiple channels.

That is, the HDMI reception unit 12b has an HDMI receiver 22. In the TMDS channels #0, #1, and #2, the HDMI receiver 22 receives the differential signal that is received in one direction from the HDMI transmission unit 11b that is connected over the HDMI cable 13 and that corresponds to the pixel data, and the differential signal that corresponds to the voice data or the control data. On this occasion, these differential signals are synchronized with the pixel clock that is transmitted from the HDMI transmission unit 11b in the TMDS clock channel and thus are received.

In addition to the three TMDS channels #0 to #2 as transmission channels for transmitting the pixel data and the voice data, and the TMDS clock channel as a transmission channel for transmitting the pixel clock, transmission channels for an HDMI system that is configured from the HDMI transmission unit 11b and the HDMI reception unit 12b include a transmission channel called a display data channel (DDC) 23 or a consumer electronic control (CEC) line 24.

The DDC 23 is made from two signal lines that are included in the HDMI cable 13. The HDMI transmission unit 11b uses the DDC 23 in order to read Enhanced Extended Display Identification Data (E-EDID) from the HDMI reception unit 12b that is connected over the HDMI cable 13. That is, in addition to the HDMI receiver 22, the HDMI reception unit 12b has an EDID Read Only Memory (ROM) in which the E-EDID that is capability information relating to its own configuration capability is stored.

The HDMI transmission unit 11b reads, over the DDC 23, the E-EDID on the HDMI reception unit 12b from the HDMI reception unit 12b that is connected over the HDMI cable 13. Then, based on the E-EDID, the HDMI transmission unit 11b recognizes setting of configuration capability of the HDMI reception unit 12b, that is, for example, a format of an image (profile), such as RGB, YCbCr 4:4:4, YCbCr 4:2:2, that an electronic apparatus having the HDMI reception unit 12b supports.

The CEC line 24 is made from one signal line that is included in the HDMI cable 13, and is used to perform bidirectional control data communication between the HDMI transmission unit 11b and the HDMI reception unit 12b. Furthermore, a line (HPD line) 25 that is connected to a pin called Hot Plug Detect (HPD) is included in the HDMI cable 13.

The source apparatus uses the line 25 and thus can detect the connection to the synchronized apparatus using direct-current bias potential. In this case, from the perspective of the source apparatus, the HPD line has a function of receiving a connection state notification from the synchronized apparatus using the direction-current bias potential. On the other hand, from the perspective of the synchronized apparatus, the HPD line has a function of notifying the source apparatus of the connection state using the direct-current bias potential.

Furthermore, a line (power source line) 26 that is used to supply electric power from the source apparatus to the synchronized apparatus is included in the HDMI cable 13. Additionally, a reserve line 27 is included in the HDMI cable 13. In some cases, a pair of differential transmission paths is configured from the HPD line 25 and the reserve line 27 and is used as a bidirectional transmission path.

FIG. 3 illustrates various transmission data periods that are present when image data of 1,920 rows of pixels and 1,080 lines in columns is transmitted in the TMDS channels #0, #1, and #2. Three types of periods, a video data period 17, a data island period 18, and a control period 19 are present in a video field in which transmission data is transmitted in the three TMDS channels #0, #1, and #2 of the HDMI, depending on types of the transmission data.

At this point, the video field period is a period from an active edge of a certain vertical synchronization signal to an active edge of the next vertical synchronization signal, and is divided into a horizontal blanking period 15, a vertical blanking period 16, and the effective pixel period 14 (active video) that is a period that results from excluding the horizontal blanking period and the vertical blanking period from the video field period.

The video data period 17 is assigned to the active video period 14. During the video data period 17, data on the effective pixels (active pixel) for 1,920 pixels×1,080 lines that make up non-compressed data for an image for one screen is transmitted. The data island period 18 and the control period 19 are assigned to the horizontal blanking period 15 and the vertical blanking period 16. During the data island period 18 and the control period 19, the auxiliary data is transmitted.

That is, the data island period 18 is assigned to one portion of the horizontal blanking period 15 and of the vertical blanking period 16. During the data island period 18, for example, a voice data packet and the like that are items of data not relating to the control, among the items of auxiliary data, are transmitted. The control period 19 is assigned to another portion of the horizontal blanking period 15 and of the vertical blanking period 16. During the control period 19, for example, a vertical synchronization signal and a horizontal synchronization signal, a control packet, and the like that are items of data relating to the control, among the items of auxiliary data, are transmitted.

According to the embodiment, over the HDMI cable 13 the disk player 11 receives, from the television receiver 12, information on a transmission method for additional information on image data with a wide color gamut that the television receiver 12 can support. The wide color gamut is hereinafter suitably shortened to "WCG".

In this case, the television receiver 12 stores in a storage unit the information on the transmission method for the additional information on the WCG image data that the television receiver 12 itself supports, and transmits the information on the transmission method to the disk player 11 over the HDMI cable 13. Moreover, in transmission specifications for additional information on the WCG image data in the related art, only transmission provisions for RGB information in accordance with sRGB or xvYCC are present, and chromaticity compression compatibility for chromaticity lying out of a color gamut in which colors can be expressed with three primary colors of RGB is not present among manufacturers.

Based on the information on the transmission method for the additional information on the WCG image data that is received from the television receiver 12, the disk player 11 selects a predetermined transmission method from among the transmission methods for the additional information on the WCG image data that the television receiver 12 can support. In this case, for example, if the multiple transmission methods for the additional information on the WCG image data that the television receiver 12 can support, are present, the disk player 11 selects in the first place the transmission method in which additional information reception processing is easiest to perform in the television receiver 12, and then selects the transmission method in which a transmission speed is high.

The disk player 11 transmits the WCG image data to the television receiver 12 over the HDMI cable 13. On this occasion, the disk player 11 transmits the additional information on the WCG image data to be transmitted, and the information on the transmission method for the additional information to the television receiver 12 over the HDMI cable 13.

The television receiver 12 receives the WCG image data from the disk player 11 over the HDMI cable 13, and receives the additional information on the WCG image data and the information on the transmission method for the additional information. Based on the received additional information on the WCG image data, the television receiver 12 performs color gamut processing, for example, color gamut compression processing that moves a chromaticity point lying out of a display color gamut of the television receiver 12 to within the display color gamut, and the like on the received WCG image data.

In the related art, for example, image data that is recorded in the disk player 11 is assumed to be displayed on a display apparatus in which sRGB, or xvYCC is produced, and thus color gamut adjustment is performed on the image data. In other words, in the related art, the color gamut of the image data is drastically compressed, compared to the gamut color in the natural world. Furthermore, for the color gamut of the display apparatus, color spaces that are wider than sRGB or xvYCC have been extended in practice. Problems in image quality occur when the image data adjusted with the color gamut that a studio monitor has is made to be in accordance with sRGB or xvYCC and thus the color gamut processing is performed.

The additional information on the WCG image data has been proposed in order to specify at least one or more chromaticity points that lie out of the three primary colors of RGB to specify the color gamut that lies out of the color gamut in the shape of a triangle that is expressed with the three primary colors of RGB. Furthermore, information on white level luminance and a chromaticity vector in such a case have been collectively proposed. In other words, the additional information on the WCG image data is configured from chromaticity vector information on the three primary colors of RGB, at least one or more pieces of chromaticity vector information that lie out of the three primary colors of RGB, luminance information on a white chromaticity point, and vector information on the white chromaticity point.

FIG. 4 illustrates a conceptual diagram of the chromaticity of each of sRGB, xvYCC, and XYZ in the related art. FIG. 4 illustrates a color gamut example in which three chromaticity points 4f, 4g, and 4h that lie out of Red (R), Green (G), and Blue (B) are determined and a region indicated by a dashed line is designated. It is illustrated that the chromaticity point 4f and the chromaticity point 4g lie outside of a chromaticity point G and a chromaticity point B, and that the color gamut is extended which is expressed by connecting the chromaticity point 4f and the chromaticity point G, the chromaticity point 4f and the chromaticity point 4g, and the chromaticity point 4g and the chromaticity point B. In the same manner, it is illustrated that the color gamut is extended which is expressed by connecting the chromaticity point B and the chromaticity point 4h and the chromaticity point 4h and the chromaticity point R.

In this manner, one or more of chromaticity points that lie outside of the chromaticity points RGB are designated and thus it is possible to express the color gamut that is difficult to express with sRGB or xvYCC in the related art. Processing is typically performed in which the chromaticity point 4a lying outside of sRGB in the related art is chromaticity-compressed, for example, in the direction of a white chromaticity point 4b on a display unit of the television receiver 12 and thus is displayed at 4e, but there is a likelihood that a difference will occur between the white chromaticity 4c on the display apparatus that is used by an image producer and 4d that is chromaticity-compressed. In such a case, the compression to a different chromaticity point is performed.

(Configuration Example of a Disk Player)

FIG. 5 is a configuration example of the disk player 11. The disk player 11 has the HDMI terminal 11a, the HDMI transmission unit 11b, and the high-speed bus interface 11c. Furthermore, the disk player 11 has a Central Processing Unit (CPU) 104, an internal bus 105, a flash Read Only Memory (ROM) 106, a Synchronous Random Access Memory (SDRAM) 107, a remote control reception unit 108, and a remote control transmission unit 109.

Furthermore, the disk player 11 has a Serial Advanced Technology Attachment (SATA) interface 110, a Blu-Ray Disc (BD) drive 111, an Ethernet Interface (I/F) 112, and a network terminal 113. Furthermore, the disk player 11 has a Moving Picture Expert Group (MPEG) decoder 114, a graphics generation circuit 115, a picture output terminal 116, and a voice output terminal 117.

Furthermore, the disk player 11 may have a display control unit 121, a panel drive circuit 122, a display panel 123, and a power source unit 124. Moreover, "Ethernet" is a registered trademark. The high-speed bus interface 11c, the CPU 104, the flash ROM 106, the SDRAM 107, the remote control reception unit 108, the SATA interface 110, the Ethernet interface 112, and the MPEG decoder 114, and the display control unit 121 are connected to the internal bus 105.

The CPU 104 controls operation of each unit of the disk player 11. The flash ROM 106 stores control software and retains the data. The SDRAM 107 makes up a work area of the CPU 104. The CPU 104 deploys on the SDRAM 107 the software or the data that is read from the flash ROM 106, starts the software and thus controls each unit of the disk player 11.

The remote control reception unit 108 receives a remote control signal (remote control code) that is transmitted from the remote control transmission unit 109 and supplies the received remote control signal to the CPU 104. The CPU 104 controls each unit of the disk player 11 according to the remote control code. Moreover, according to the embodiment, the remote control transmission unit 109 is illustrated as a user instruction input unit, but the user instruction input unit may have different configurations, such as a touch panel unit that performs an instruction input using proximity/touch, a mouse, a keyboard, a gesture input unit that detects the instruction input using a mouse a camera, and a voice input unit that performs the instruction input using a voice.

The BD drive 111 records content data on a BD disc (not illustrated) as a disk-shaped recording medium, or reproduces the content data from the BD. The BD drive 111 is connected to the internal bus 105 through the SATA interface 110. The MPEG decoder 114 performs coding processing on an MPEG 2 stream reproduced in the BD drive 111 and thus obtains image data and voice data.

The graphics generation circuit 115 performs convolution processing of graphic data on the image data that is obtained in the MPEG decoder 114, whenever necessary. The picture output terminal 116 outputs the image data that is output from the graphics generation circuit 115. The voice output terminal 117 outputs the voice data that is obtained in the MPEG decoder 114.

The panel drive circuit 122 drives the display panel 123, based on picture (image) data that is output from the graphics generation circuit 115. The display control unit 121 controls the graphics generation circuit 115 or the panel drive circuit 122 and thus controls displaying on the display panel 123. The display panel 123, for example, is configured from a Liquid Crystal Display (LCD), an Organic Electro-Luminescence (EL) panel, or the like.

Moreover, according to the embodiment, the example in which the display control unit 121 is provided in addition to the CPU 104 is illustrated, but the CPU 104 may directly control the display on the display panel 123. Furthermore, the CPU 104 and the display control unit 121 may be integrated into one chip, and may be multiple cores. The power source unit 124 supplies electric power to each unit of the disk player 11. The power source unit 124 may be an AC power source or a battery (a storage battery or a dry cell battery).

With communication in compliance with HDMI, the HDMI transmission unit (HDMI source) 11b outputs the image (picture) data and the voice data in a baseband from the HDMI terminal 11a. The high-speed bus interface 11c is an interface for the bidirectional communication path that is configured from predetermined lines (a reserve line and an HPD line according to the embodiment) that make up the HDMI cable 13.

The high-speed bus interface 11c is inserted between the Ethernet interface 112 and the HDMI terminal 101. The high-speed bus interface 11c transmits the transmission data that is supplied from the CPU 104, from the HDMI terminal 101 to the other party's apparatus over the HDMI cable 13. Furthermore, the high-speed bus interface 11c supplies reception data received from the other party's apparatus through the HDMI terminal 11a from the HDMI cable 13 to the CPU 104.

Operation of the disk player 11 illustrated in FIG. 5 is briefly described. At the time of the recording, content data that has to be recorded is obtained through a digital tuner not illustrated, or through the Ethernet interface 112 from the network terminal 113, or through the high-speed bus interface 11c from the HDMI terminal 11a. The content data is input into the SATA interface 110 and is recorded on the BD by the BD drive 111. In some cases, the content data may be recorded on a hard disk drive (HDD) connected to the SATA interface 110, which is not illustrated.

At the time of the reproducing, the content data (MPEG stream) that is reproduced from the BD by the BD drive 111 is supplied to the MPEG decoder 114 through the SATA interface 110. In the MPEG decoder 114, decoding processing is performed on the reproduced content data, and the image data and the voice data in the baseband are obtained. The image data is output to the picture output terminal 116 through the graphics generation circuit 115. Furthermore, the voice data is output to the voice output terminal 117.

Furthermore, at the time of the reproducing, according to a user's operation, the image data obtained in the MPEG decoder 114 is supplied to the panel drive circuit 122 through the graphics generation circuit 115, and a reproduction image is displayed on the display panel 123. Furthermore, according to the user's operation, the voice data obtained in the MPEG decoder 114 is supplied to a speaker not illustrated, and voice that corresponds to the reproduction image is output.

Furthermore, at the time of the reproducing, if the image data and the voice data that are obtained in the MPEG decoder 114 are transmitted in the TMDS channels of the HDMI, the image data and the voice data are supplied to the HDMI transmission unit 11b, and thus are packed and are output from the HDMI transmission unit 11b to the HDMI terminal 11a.

Furthermore, at the time of the reproducing, when the content data reproduced in the BD drive 111 is sent to a network, the content data is output to the network terminal 113 through the Ethernet interface 112. In the same manner, at the time of the reproducing, when the content data reproduced in the BD drive 111 is sent to the bidirectional communication path of the HDMI cable 13, the content data is output to the HDMI terminal 11a through the high-speed bus interface 11c.

(Configuration Example of the Television Receiver)

FIG. 6 illustrates a configuration example of the television receiver 12. The television receiver 12 has the HDMI terminal 12a, the HDMI reception unit 12b, and the high-speed bus interface 12c. Furthermore, the television receiver 12 has an antenna terminal 205, a digital tuner 206, an MPEG decoder 207, a picture signal processing circuit 208, a graphics generation circuit 209, a panel drive circuit 210, and a display panel 211.

Furthermore, the television receiver 12 has a voice signal processing circuit 212, a voice amplification circuit 213, a speaker 214, an internal bus 220, a CPU 221, a flash ROM 222, and a Dynamic Random Access Memory (DRAM) 223. Furthermore, the television receiver 12 has an Ethernet interface (I/F) 224, a network terminal 225, a remote control reception unit 226, and a remote control transmission unit 227. Furthermore, the television receiver 12 has a display control unit 231 and a power source unit 232. Moreover, "Ethernet" is a registered trademark.

The antenna terminal 205 is a terminal into which to input a television broadcasting signal received in a reception antenna (not illustrated). The digital tuner 206 processes the television broadcasting signal that is input into the antenna terminal 205 and thus extracts a partial Transport Stream (TS) (TS packets of the picture image, and TS packets of the voice data) from a predetermined transport stream that corresponds to a channel selected by the user.

Furthermore, the digital tuner 206 takes Program Specific Information/Service Information (PSI/SI) out of the obtained transport stream, and outputs the PSI/SI to the CPU 221. Processing that extracts the partial TS in an arbitrary channel from the multiple transport streams obtained in the digital tuner 206 is possible by obtaining information on a packet ID (PID) in the arbitrary channel from the PSI/SI (PAT/PMT).

The MPEG decoder 207 performs the decoding processing on a Picture Packetized Elementary Stream (PES) packet that is configured from the TS packets of the picture data that is obtained in the digital tuner 206, and thus obtains the image data. Furthermore, the MPEG decoder 207 performs the decoding processing on a voice PED packet that is configured from the TS packet of the voice data that is obtained in the digital tuner 206, and thus obtains the voice data.

The picture signal processing circuit 208 and the graphics generation circuit 209 perform scaling processing (resolution conversion processing), convolution processing of the graphics data, the gamma correction of the WCG image, and the like on the image data obtained in the MPEG decoder 207 or the image data received in an HDMI reception unit 202, whenever necessary.

The panel drive circuit 210 drives the display panel 211, based on picture (image) data that is output from the graphics generation circuit 209. The display control unit 231 controls the graphics generation circuit 209 or the panel drive circuit 210 and thus controls displaying on the display panel 211. The display panel 211, for example, is configured from a Liquid Crystal Display (LCD), a Plasma Display Panel (PDP), an Organic Electro-Luminescence (EL) panel, or the like.

Moreover, according to the embodiment, the example in which the display control unit 231 is provided in addition to the CPU 221 is illustrated, but the CPU 221 may directly control the displaying on the display panel 211. Furthermore, the CPU 221 and the display control unit 231 may be integrated into one chip, and may be multiple cores. The power source unit 232 supplies electric power to each unit of the television receiver 12. The power source unit 232 may be an AC power source or a battery (a storage battery or a dry cell battery).

The voice signal processing circuit 212 performs necessary processing, such as D/A conversion, on the voice data obtained in the MPEG decoder 207. The voice amplification circuit 213 amplifies a voice signal that is output from the voice signal processing circuit 212, and thus supplies the amplified voice signal to the speaker 214. The CPU 221 controls operation of each unit of the television receiver 12. The flash ROM 222 stores control software and retains the data. The DRAM 223 makes up a work area of the CPU 221. The CPU 221 deploys on the DRAM 223 software and data that are read from the flash ROM 222, starts the software and thus controls each unit of the television receiver 12.

The remote control reception unit 226 receives a remote control signal (remote control code) that is transmitted from the remote control transmission unit 227 and supplies the received remote control signal to the CPU 221. The CPU 221 controls each unit of the television receiver 12, based on the remote control code. Moreover, according to the embodiment, the remote control transmission unit 227 is illustrated as a user instruction input unit, but the user instruction input unit may have different configurations, such as a touch panel unit that performs an instruction input using proximity/touch, a mouse, a keyboard, a gesture input unit that detects the instruction input using a camera, and a voice input unit that performs the instruction input using a voice.

The network terminal 225 is a terminal that is connected to the network, and is connected to the Ethernet interface 224. The high-speed bus interface 12c, the CPU 221, the flash ROM 222, the DRAM 223, the Ethernet interface 224, the MPEG decoder 207, and the display control unit 231 are connected to the internal bus 220.

With the communication in compliance with HDMI, the HDMI reception unit (HDMI synchronization) 12b receives the image (picture) data and the voice data in the baseband, which is supplied to the HDMI terminal 12a over the HDMI cable 13. Like the high-speed bus interface 11c of the disk player 11 described above, the high-speed bus interface 12c is an interface for the bidirectional communication path that is configured from predetermined lines (the reserve line and the HPD line according to the embodiment) that make up the HDMI cable 13.

The high-speed bus interface 12c is inserted between the Ethernet interface 224 and the HDMI terminal 201. The high-speed bus interface 12c transmits the transmission data that is supplied from the CPU 221, from the HDMI terminal 12a to the other party's apparatus over the HDMI cable 13. Furthermore, the high-speed bus interface 12c supplies the reception data, which is received from the other party's apparatus through the HDMI terminal 12a from the HDMI cable 13, to the CPU 221.

Operation of the television receiver 12 illustrated in FIG. 6 is briefly described. The television broadcasting signal that is input into the antenna terminal 205 is supplied to the digital tuner 206. In the digital tuner 206, the television broadcasting signal is processed, a predetermined transport stream that corresponds to the channel selected by the user is output, a partial TS (the TS packets of the picture image, and the TS packets of the voice data) is extracted from the transport stream, and the partial TS is supplied to the MPEG decoder 207.

In the MPEG decoder 207, the decoding processing is performed on a picture PES packet that is configured from the TS packet of the picture data, and thus the picture data is obtained. The scaling processing (resolution conversion processing), the convolution processing of the graphics data, and the like are performed on the picture data in the picture signal processing circuit 208 and the graphics generation circuit 209, whenever necessary, and then the picture data is supplied to the panel drive circuit 210. For this reason, the image that corresponds to the channel selected by the user is displayed on the display panel 211.

Furthermore, in the MPEG decoder 207, the decoding processing is performed on a voice PES packet that is configured from the TS packet of the voice data, and thus the voice data is obtained. Necessary processing such as the D/A conversion is performed on the voice data in the voice signal processing circuit 212, the voice data is additionally amplified in the voice amplification circuit 213, and then the voice data is supplied to the speaker 214. For this reason, the voice that corresponds to the channel selected by the user is output from the speaker 214.

Furthermore, the content data (the image data and the voice data), which is supplied from the network terminal 225 to the Ethernet interface 224, or which is supplied from the HDMI terminal 12a through the high-speed bus interface 12c, is supplied to the MPEG decoder 207. Subsequently, the same operation as when the television broadcasting signal described above is received is performed, and thus the image is displayed on the display panel 211 and the voice is output from the speaker 214.

Furthermore, in the HDMI reception unit 12b, the image data and the voice data are obtained that are transmitted from the disk player 11 that is connected to the HDMI terminal 12a over the HDMI cable 13. The image data is supplied to the picture signal processing circuit 208. Furthermore, the voice data is supplied directly to the voice signal processing circuit 212. Subsequently, the same operation as when the television broadcasting signal described above is received is performed, and thus the image is displayed on the display panel 211 and the voice is output from the speaker 214.

Moreover, if the image data received in the HDMI reception unit 12b is the WCG image data, in the picture signal processing circuit 208, the image data for displaying the WCG image data is generated, and the color gamut processing is performed based on the additional information on the WCG image data received in the HDMI reception unit 12b or the high-speed bus interface 12c. For this reason, the WCG image is displayed on the display panel 211.

(Example of a Data Structure of the EDID)

FIG. 7 illustrates an example of a data structure of the E-EDID. The E-EDID is made from a basic block and an extension block. Data that is prescribed with E-EDID 1.3 standard that are expressed as "E-EDID 1.3 Basic Structure" is arranged in a head of the basic block. Subsequently, timing information for maintaining compatibility with the previous EDID, which is expressed as "Preferred timing", and timing information different from "Preferring timing" for maintaining the compatibility with the previous EDID, which is expressed as "2nd timing", are arranged.

Furthermore, in the basic block, subsequently to "2nd timing", information indicating a name of the display apparatus that is expressed as "Monitor Name", and information indicating the number of pixels that are available for display in the case of an aspect ratio of 4 to 3 or 16 to 9, which is expressed as "Monitor Range Limits" are sequentially arranged.

In a head of the extension block, an image size (resolution) that is available for display, a frame rate, information indicating whether the display is interlaced or progressive, and data containing a description of information such as an aspect ratio, which are expressed as "Short Video Descriptor", and a reproducible method of coding and decoding voice, a sampling frequency, a cut-off band, and data containing a description of information such as the number of codec bits, which are expressed as "Short Audio Descriptor", and information relating to left and right speakers, which is expressed as "Speaker Allocation", are sequentially arranged.

Furthermore, in the extension block, subsequently to "Speaker Allocation", data that is specifically defined for every manufacturer, which is expressed as "Vendor Specific", timing information for maintaining compatibility with the EDID in the related art, which is expressed as "3rd timing", and timing information for maintaining compatibility with the EDID in the related art, which is expressed as "4th timing", are arranged.

(Example of the Data Structure of a Vendor Specific Data Block (VSDB) Region)

According to the embodiment, the data area that is extended to store the information on the transmission method for the additional information on the WCG image data is defined in a VSDB region. FIG. 8 illustrates an example of the data structure of the VSDB region. 0-th to N-th blocks, each of which is one byte block, are provided in the VSDB region.

A data region of the information on the transmission method for the additional information on the WCG image data that the synchronized apparatus (the television receiver 12 according to the embodiment) has to store is defined in a fourth bit of an eighth byte and a (15+M)-th byte subsequent to 0-th to (15+M−1)-th bytes that are already defined.

First, 0-th to 8-th bytes are described. A header indicating a data region that is expressed as "Vendor-specific tag code (=3), and information indicating a length of the VSDB data that is expressed as "Length (=N)" are arranged in the 0-th byte arranged in the head of the data, which is expressed as "Vendor Specific". Furthermore, information indicating a number "0x000C03" that is registered for HDMI (R), which is expressed as "24 bit IEEE Registration Identifier (0x000C03) LSB first" is arranged in first to third bytes.

Additionally, information indicating a 24-bit physical address of the synchronized apparatus, which is expressed by each of "A", "B", "C" and "D" is arranged in fourth to fifth bytes. A flag indicating a function that the synchronized apparatus supports, which is expressed as "Supports-AI", each piece of information assigning the number of bits per one pixel, which is expressed as each of "DC-48 bit", "DC-36 bit", and "DC-30 bit", a flag indicating whether the synchronized apparatus supports the transmission of a 4:4:4 YCbCr image, which is expressed as "DC-Y 444", and a flag indicating whether the synchronized apparatus supports a dual Digital Visual interface (DVI), which is expressed as "DVI-Dual", are arranged in a sixth byte.

Furthermore, information indicating a maximum frequency of a pixel clock of the TMDS, which is expressed as "Max-TMDS-Clock" is arranged in a seventh byte. Flags of information assigning the presence of a Latency field, information assigning the presence of an Interlace Latency field, information assigning the presence of extension of a 3D video format, and information assigning support of a function of a content type (CNC) are arranged in an eighth byte. In a fourth bit of the eighth byte, "WCG_Extension", a flag indicating whether or not WCG information that the synchronized apparatus supports is present is newly arranged. If the flag is True "1", this indicates that the information on the transmission method for the additional information on the WCG image data is present in a (15+M)-th byte.

Next, the (15+M)-th byte is described. The information on the transmission method for the additional information on the WCG image that the synchronized apparatus supports, is written into the (15+M)-th byte. If the synchronized apparatus supports transmission of a GBD packet that is inserted during a data island period 18 (refer to FIG. 3), "GBD" in a seventh bit is set to True "1". If the synchronized apparatus supports transmission of a VSIF packet that is inserted during the data island period 18, "VSIF" in a sixth bit is set to True "1".

If the synchronized apparatus supports transmission of an AVIF packet that is inserted during the data island period 18, "AVIF" in a fifth bit is set to True "1". If the synchronized apparatus supports transmission of the additional information on the WCG image through the high-speed bus interface 12c, "HEC" in a fourth bit is set to True "1". If methods other than this are proposed, third to 0-th bits are available for assignment.

At this point, a method of storing the information on the transmission method for the additional information on the WCG image data using the VSDB region is proposed. However, the storing of the information on the transmission method is not limited to this method, because the storing of the information is realizable also in data regions other than this, with the data structure of the E-EDID, for example, such as with a Video Capability Data Block (VCDB).

In the AV system 10 illustrated in FIG. 1, the CPU 104 of the disk player 11 (source apparatus) checks for the connection to the television receiver (synchronized apparatus) 12 using the HPD line (refer to FIG. 2). Thereafter, the CPU 104 of the disk player 11 reads the E-EDID, and therefore the information on the transmission method for the additional information on the WCG image data from the television receiver 12 using DDC 23 (refer to FIG. 2), and recognizes the transmission method for the additional information on the WCG image data that the television receiver 12 supports.

In the AV system 10 illustrated in FIG. 1, when the WCG image data is transmitted to the television receiver 12, the disk player 11, as described above, selects any one from among the transmission methods for the additional information on the WCG image data that the television receiver 12 can support, based on the information on the transmission method for the additional information on the WCG image data, which is read from the television receiver 12. Then, the disk player 11 transmits the additional information on the WCG image data that is currently transmitted and the information on the transmission method for the additional information together to the television receiver 12.

In this case, the disk player 11 transmits the information to the television receiver 12 by inserting the information during the blanking period of the WCG image data (picture signal) that is transmitted to the television receiver 12. At this point, the disk player 11, for example, inserts the additional information on the WCG image data that is currently transmitted and the information on the transmission method for the additional information, into the blanking period of the WCG image data, by using a Vendor Specific InfoFrame (hereinafter referred to as "VSIF") packet of HDMI and the like. The VSIF packet is arranged in the data island period 18 described above.

(Example of a Data Structure of the VSIF Packet)

FIG. 9 illustrates an example of a data structure of the VSIF packet. With HDMI, supplementary information relating to the image can be transmitted from the source apparatus to the synchronized apparatus using the VSIF packet. A checksum of the data is defined in a 0-th byte. Information indicating a number "0x000C03" that is registered for HDMI (R), which is expressed as "24 bit IEEE Registration Identifier (0x000C03) LSB first" is arranged in first to third bytes.

A flag indicating whether or not 3D data is present in fifth to (7+N)-th bytes subsequent to a fourth byte is assigned to a seventh bit of a fourth byte. A "WCG_Format" flag indicating whether or not the additional information on the WCG image is present in (8+N)-th and later bytes is assigned to a succeeding sixth bit. If the "WCG_Format" flag is True "1", supplementary information relating to the WCG image is assigned to (8+N)-th to (18+N+2*M)-th bytes. If the "WCG_Format" flag is False "0", this indicates that there is no transmission of the additional information on the WCG image using the VSIF packet.

Fifth to fourth bits indicates "WCG_Type", the information on the transmission method for the additional information on the WCG image other than the VSIF packet. "0b10" indicates the transmission using the GBD packet, and "0b01" indicates the transmission using the high-speed bus interface 11c.

An X-axis vector value of a white chromaticity point, "X_Vector_White" is assigned to (8+N)-th to (9+N)-th bytes. A Y-axis vector value of the white chromaticity point, "Y_Vector_White" is assigned to (10+N)-th to (11+N)-th bytes. A luminance value of the white chromaticity point, "Luminance_White_Value" is assigned to (12+N)-th to (13+N)-th bytes.

The number of vertices of the chromaticity points that are assigned, "Number Vertices (M)" is assigned to a (14+N)-th byte. The number of vertices of the chromaticity points is equal to or greater than 3. Information on the X-axis vector value of each of the chromaticity points, "X_Vector_N" and information on the Y-axis vector value, "Y_Vector_N" are assigned to (15+N)-th to (18+N+2*M)-th bytes.

If any bit of fourth to sixth bits of the fourth byte is set to True "1", the synchronized apparatus (the television receiver 12 according to the embodiment) can determine the additional information on the WCG image data and the transmission method for the additional information.

FIG. 10 illustrates the data structure of "X_Vector_N". "X_Vector_White", "Y_Vector_White", "X_Vector_N", and "Y_Vector_N" in an XYZ coordinate system have positive values from 0 to 1. For this reason, because if color precision is 8 bits, the color precision can be expressed using 7 bits, a sum of 2 bits for an integer and 5 bits for a fraction, the number of bytes that is necessary for each is 1.

Furthermore, because if the color precision is 10 bits, the color precision can be expressed using 9 bits, a sum of 2 bits for an integer and 7 bits for a fraction, the number of bytes that is necessary for each is 2. In the same manner, because if the color precision is 12 bits, the color precision can be expressed using 11 bits, a sum of 2 bits for an integer and 9 bits for a fraction, the number of bytes that is necessary for each is 2. The example of the data structure in FIG. 10 illustrates a case where the color precision is 12 bits.

(Example of a Data Structure of the GBD Packet)

FIG. 11 illustrates an example of a data structure of the GBD packet. With the HDMI, the supplementary information relating to the WCG image can be transmitted from the source apparatus to the synchronized apparatus using the GBD packet. A "Format_Flag", a method of describing gamut information, is assigned to a seventh bit of a 0-th byte. If a vertex border of the chromaticity point is described, "0" is assigned. "Facet_Mode", a flag indicating whether or not facet data is present in the gamut information that follows, is assigned to a sixth bit of the 0-th byte.

Because transmission regulations for the facet data are undecided in the current HDMI standards, "0" is assigned to the sixth bit. The precision of the gamut information, "GBD_Color_Precision" is assigned to fifth to fourth bits of the 0-th byte. If "0b00" is assigned to fourth to third bits, the color precision thereof is 8 bits. Furthermore, "0b01" is assigned to the fourth to third bits, the color precision of thereof is 10 bits, and if "0b10" is assigned to the fourth to third bits, the color precision thereof is 12 bits.

The information on a color space, "GBD_Color_Space", is assigned to second to 0-th bits. If "0b000" is assigned to the second to 0-th bits, the color space thereof is set to ITU-R BT.709 (sRGB). If "0b001" is assigned to the second to 0-th bits, the color space thereof is set to be IEC 61966-2-4-SD (xvYCC601). If "0b010" is assigned to the second to 0-th bits, the color space thereof is set to be IEC 61966-2-4-HD (xvYCC 709). If "0b011" is assigned to the second to 0-th bits, the color space thereof is set to be XYZ. According to the present technology, because the transmission of the information, such as the chromaticity point in accordance with color space XYZ, is newly stipulated, the data structure after the first byte is proposed as follows.

The X-axis vector value of the white chromaticity point, "X_Vector_White" is assigned to first to second bytes. The Y-axis vector value of the white chromaticity point, "Y_Vector_White" is assigned to third to fourth bytes. The luminance value of the white chromaticity point, "Luminance_White_Value" is assigned to fifth to sixth bytes. The number of vertices of the chromaticity points that are assigned, "Number Vertices (N)" is assigned to the fifth byte. The number of vertices of the chromaticity points is equal to or greater than 3.

The information on the X-axis vector value of each of the chromaticity points, "X_Vector_N" and the information on the Y-axis vector value, "Y_Vector_N" are assigned to sixth to (2*N+5)-th bytes. The data structures of "X_Vector_White", "Y_Vector_White", "X_Vector_N", and "Y_Vector_N" are set to be the same as those illustrated in FIG. 10, which are described with the VSIF data structure.

Moreover, at this point, the method of transmitting the additional information on the WCG image data and the information on the transmission method for the additional information on the WCG image data using the VSIF packet is proposed, but, for example, the transmitting of the additional information and the information on the transmission method is not limited to this method, because the transmitting is realizable also with data packets other than this, for example, such as with an Auxiliary Video (AV)/InfoFrame. However, if the information on the transmission method for the additional information on the WCG image data on the television receiver (synchronized apparatus) 12 is transmitted to the disk player (source apparatus) 11 using the VSDB region of the E-EDID data region, it is desirable that the information relating to the WCG of the disk player 11 be transmitted with the VSIF packet.

(Example of Processing by the Source Apparatus at the Time of Connection to an Apparatus)

Next, processing by the disk player (source apparatus) 11 at the time of connection to the television receiver (synchronized apparatus) 12 in the AV system 10 illustrated in FIG. 1 is described referring to a flow chart in FIG. 12.

The disk player 11 starts processing in Step ST1, and thereafter proceeds to processing in Step ST2. In Step ST2, the disk player 11 determines whether or not a HPD signal is at a high level "H". When the HPD signal is not at the high level "H", the television receiver (synchronized apparatus) 12 is not connected to the disk player 11. At this time, the disk player 11 proceeds to Step ST8, and the processing ends.

If the HPD signal is at the high level "H", the disk player 11 reads the E-EDID on the television receiver 12 in Step ST3. Then, in Step ST4, the disk player 11 determines whether or not there is the information on the transmission method for the additional information on the WCG image data. When the information on the transmission method for the additional information on the WCG image data is not present, the disk player 11 sets the data indicating non-transmission of the additional information on the WCG image data to be in the VSIF packet in Step ST7, and thereafter, proceeds to Step ST8, and the processing ends. The setting of the data indicating the non-transmission of the additional information on the WCG image data means that sixth to fourth bits of the fourth byte in the VSIF packet (refer to FIG. 9) are set to False "0".

Furthermore, when the information on the transmission method for the additional information on the WCG image data is present in Step ST4, the disk player 11 determines the transmission method for the additional information on the WCG image data in Step ST5. Then, the disk player 11 sets the data indicating the transmission method for the additional information on the WCG image data to be in the VSIF packet in Step ST6, and sets the additional information to be in the packet according to the transmission method. Thereafter, the processing proceeds to Step ST8 and ends. At this point, the setting of the data indicating the transmission method for the additional information on the WCG image data means that any bit of the sixth to fourth bits of the fourth byte in the VSIF packet (refer to FIG. 9) is set to True "1".

(Example of Processing by the Synchronized Apparatus of the Additional Information on the WCG Image Data)

Next, processing that is performed in the television receiver (synchronized apparatus) 12 when the WCG image data starts to be received from the disk player (source apparatus) 11 in the AV system 10 illustrated in FIG. 1 is described referring to a flow chart in FIG. 13.

The television receiver 12 starts processing in Step ST10, and thereafter proceeds to processing in Step ST11. In Step ST11, the television receiver 12 determines whether or not any one of the sixth to fourth bits of the fourth byte in the VSIF packet that is transmitted from the disk player 11 is set to True "1". If none of the sixth to fourth bits of the fourth byte is set to True "1", it is determined that the additional information on the WCG image data is in a non-transmission state, and the processing proceeds to Step ST18, and ends.

If any one of the sixth to fourth bits of the fourth byte is set to True "1" in Step ST11, the television receiver 12 proceeds to Step ST12. In Step ST12, the television receiver 12 determines whether or not the sixth bit of the fourth byte is set to True "1". If the sixth bit is set to True "1", the television receiver 12 determines that the additional information on the WCG image data is transmitted using the VSIF packet, and proceeds to Step ST13. If the sixth bit is set to False "0", the television receiver 12 proceeds to Step ST14.

In Step ST13, the television receiver 12 receives (8+N)-th to (18+N+2*M)-th bytes in the VSIF packet and proceeds to the next Step ST17.

In Step ST14, the television receiver 12 determines whether or not a fifth bit of the fourth byte is set to True "1". If the fifth bit is set to True "1", the television receiver 12 determines that the additional information on the WCG image data is transmitted using the GBD packet, and proceeds to Step ST15. If the fifth bit is set to False "0", the television receiver 12 proceeds to Step ST16.

In Step ST15, the television receiver 12 receives first to (11+2*(N−1))-th bytes in the GBD packet, and proceeds to the next Step ST17.

In Step ST16, the television receiver 12 receives an additional information packet that is transmitted over an HEC transmission path, and proceeds to the next Step ST17.

In Step S17, the television receiver 12 executes the color gamut processing on the WCG image using the received additional information, and proceeds to Step ST18, and the processing ends.

As described above, in the AV system 10 illustrated in FIG. 1, the WCG image data is transmitted from the disk player 11 to the television receiver 12 over the HDMI cable 13, the additional information on the WCG image data and the information on the transmission method for the additional information are transmitted over the same HDMI cable 13, and thus the transmission of the image data with a wide color gamut can be satisfactorily performed. For example, the television receiver 12 can reliably receive the additional information on the WCG image data, based on the received information on the transmission method.

Furthermore, in the AV system 10 illustrated in FIG. 1, when the additional information on the WCG image data is transmitted, the disk player 11 selects the transmission method for the additional information on the WCG image data to be transmitted, from the transmission methods for the additional information on the WCG image that the television receiver 12 can support. For this reason, the television receiver 12 can reliably receive the additional information on the image data with the wide color gamut that is transmitted from the disk player 11.

(2. Modification Examples)

Moreover, according to the embodiment described above, the disk player 11 inserts the information on the transmission method for the additional information on the WCG image data using the VSIF packet during the blanking period of the image (picture signal), and thus transmits the inserted information on the transmission method to the television receiver 12.

For example, the disk player 11 may transmit the information on the transmission method for the additional information on the WCG image data to the television receiver 12 over the bidirectional communication path that is configured from the reserve line 27 and the HDP line 25 of the HDMI cable 13.

Furthermore, according to the embodiment described above, the information on the transmission method for the additional information on the WCG image data that the television receiver 12 supports, is included in the E-EDID on the television receiver 12, and the disk player 11 reads the E-EDID over the DDC 23 of the HDMI cable 13, and thus obtains the information on the transmission method for the additional information on the WCG image data that the television receiver 12 supports.

However, the disk player 11 may receive the information on the transmission method for the additional information on the WCG image data that the television receiver 12 supports, from the television receiver 12 over the bidirectional communication path that is configured from the reserve line 27 and the HDP line 25 of the HDMI cable 13.

Furthermore, according to the embodiment described above, it is illustrated that the HDMI transmission path is used. However, in addition to the HDMI, as baseband digital interfaces, there are a Mobile High-definition Link (MHL), a Digital Visual Interface (DVI) interface, a Display Port (DP) interface, a wireless interface using 60 GHz millimeter wave and the like. The present technology can be applied in the same manner also to a case where the additional information on the WCG image data is transmitted with these digital interfaces.

(Example of a Structure of a DP System)

FIG. 14 illustrates a configuration example of a DP system 300 that uses a DP interface. In the DP system 300, a DP transmitter 301 and a DP receiver 307 are connected to each other with a DP cable 303. In addition, the DP transmitter 301 includes a DP transmission unit 302, and the DP receiver 307 includes a DP reception unit 308 and a storage unit 309.

The DP cable 303 is configured from a main link 304, an AUX channel 305, and a hot plug detection line 306. The main link 304 is configured from one, two, or four duplex terminal differential signal pairs (pair lines), and does not have a dedicated clock signal, and a clock is instead embedded in an 8B/10B coded-data stream.

Unlike in the HDMI, in the DP interface, a transmission speed and a pixel frequency are independent of each other, and a pixel depth or resolution, a frame frequency, the presence or absence of voice data within a transmission stream or additional data such as DRM information, and an amount of the voice data or of the additional data can be freely adjusted. The transmission of the WCG image data, the additional information on the WCG image data, and the information on the transmission method for the additional information is performed using the main link 304.

For the transmission data structure, the TMDS transmission data structure (refer to FIG. 3) is used in the HDMI. Furthermore, the additional information on the WCG image data and the information on the transmission method for the additional information use the packet of which the data structure is the same as that of the VSIF packet (refer to FIG. 9) and the like that is inserted during the control period 19 (refer to FIG. 3) in the HDMI and thus is transmitted.

The DP transmitter 301 checks for a connection to the DP receiver 307 with the hot plug detection line 306. Thereafter, using the AUX channel 305, the DP transmitter 301 reads the WCG image information in the E-EDID from the storage unit 309 of the DP receiver 307, and recognizes the transmission method for the WCG image that the DP receiver 307 supports. The data structure of the WCG image information in the E-EDID in the DP receiver 307 may be the same as the one in FIG. 8.

Furthermore, in the DP interface, separately from the main link 304, there is an AUX channel 305 that operates in a bandwidth of 1 Megabits/sec or a bandwidth of 720 Megabits/sec in a half duplex bidirection, and exchange of information relating to a function between a transmission apparatus and a reception apparatus is performed with the bidirectional communication. The transmission of the additional information on the WCG image data and the information on the transmission method for the additional information can be performed using the AUX channel 305.

(Example of a Data Structure of the AUX Channel)

FIG. 15 illustrates a syntax in a case where the transmission of the additional information on the WCG image data and the information on the transmission method for the additional information is performed using the AUX channel 305. The packet is configured to include a header section that is configured from a synchronization SYNC portion, a 4-bit command portion, and a 20-bit memory address of the storage unit 309, a data section that is configured from an 8-bit data length portion and an 8-bit to 128- or 512-bit payload portion, and a STOP bit.

The additional information on the WCG image data and the information on the transmission method for the additional information are inserted into the payload portion. When the additional information on the WCG image data and the information on the transmission method for the additional information are transmitted from the DP transmitter 301 to the DP receiver 307, the command portion of the header section is set to 0b1000. Syntax Data that is expressed as "Metadata_tx" is set to be in the payload portion. "Continuation flag" is a bit that indicates continuity when a data length of the payload portion of one packet is smaller than those of the additional information on the WCG image data and the information on the transmission method for the additional information that have to be transmitted, and thus these pieces of information are divided into multiple packets and are transmitted. "Metadata_type" indicates a method that the DP transmitter 301 selects based on the information on the transmission method for the additional information on the WCG image data that the DP receiver 307 supports. A data length of "Metadata" that follows is set to be in "Metadata_length". The additional information on the WCG image data and the information on the transmission method for the additional information that are to be transmitted are set to be in "Metadata".

Furthermore, when the information on the transmission method for the WCG image data that the DP receiver 307 supports is obtained, the DP transmitter 301 sets 0b1001 to be in the command portion of the header section. Syntax Data that is expressed as "EDID-read" is set to be in the payload portion. A byte length of data in the information on the transmission method for the additional information on the WCG image data to be obtained is set to be in "HDR_VSDB_length". In this manner, also in the DP system 300, the additional information on the WCG image data and the information on the transmission method for the additional information can be transmitted in the same manner as in the AV system 10 in the HDMI.

(Example of a Structure of an MHL System)

FIG. 16 illustrates a configuration example of an MHL system 400 that uses an MHL interface. In the MHL system, an MHL transmitter 401 and an MHL receiver 408 are connected to each other with an MHL cable 404. In addition, the MHL transmitter 401 includes a TMDS transmission unit 402 and a storage unit 403, and the MHL receiver 408 includes an MDS reception unit 409, a storage unit 410, and an EDID-ROM 411.

The MHL cable 404 is configured from a TMDS channel 405, an enhanced MHL Link Control Bus (eCBUS) line 406, and a power supply MHL Voltage Bus (VBUS) line 407. The TMDS channel 405 is configured to include one pair of differential signals, and the transmission of the WCG image data, the additional information on the WCG image data, and the information on the transmission method for the additional information is performed.

For the transmission data structure, the TMDS transmission data structure (refer to FIG. 3) is used in the HDMI. Furthermore, the additional information on the WCG image data and the information on the transmission method for the additional information use the packet of which the data structure is the same as those of the VSIF packet (refer to FIG. 9) and the like that are inserted during the control period 19 (refer to FIG. 3) in the HDMI and thus are transmitted.

In the eCBUS line 406, when a data section of the packet data in FIG. 17 is set to 0x64, HPD indicates a high level "1", and when the data section of the packet data is set to 0x65, the HPD indicates a low level "0". Thus, the MHL transmitter 401 checks for a connection to the MHL receiver 408 over the eCBUS line 406.

Thereafter, using the eCBUS line 406, the MHL transmitter 401 reads the information on the transmission method for the additional information for the WCG image in the E-EDID from the MHL receiver 408 and recognizes the transmission method for the WCG image that the MHL receiver 408 supports. The data structure of the WCG image information in the E-EDID in the MHL receiver 408 may be the same as the one in FIG. 8.

(Example of a Data Structure of the CBUS Line)

FIG. 18 illustrates a data structure in a case where the transmission of the additional information on the WCG image data and the information on the transmission method for the additional information is performed in the eCBUS line 406. Usually, because the packet that is transmitted over the eCBUS line 406 is transmitted by multiplexing in a time division manner the data that is one byte in data length, a delay occurs when the data that is great in data length is transmitted such as the additional information on the WCG image data and the information on the transmission method for the additional information, and the eCBUS line 406 is unsuitable for the data that asks for real-time transmission. Then, a "Block Protocol" of an enhanced MHL-Specific Communication (eMSC) is used that can block-transmit up to 256-byte data. The packet is configured to include a 2-byte request command section (0xFF), a response waiting NULL section, a START section, a 256-byte payload section, a 2-byte CRC section, and a response waiting NULL section.

The additional information on the WCG image data and the information on the transmission method for the additional information are inserted into the payload section. Syntax Data that is expressed as "Metadata_tx" is set to be in the payload portion. "Metadata_type" indicates a method that the MHL transmitter 401 selects based on the information on the transmission method for the additional information on the WCG image data that the MHL receiver 408 supports. A data length of "Metadata" that follows is set to be in "Metadata_length". The additional information on the WCG image data and the information on the transmission method for the additional information that are to be transmitted are set to be in "Metadata". In this manner, also in the MHL system 400, the additional information on the WCG image data and the information on the transmission method for the additional information can be transmitted in the same manner as in the AD system 10 in the HDMI.

Furthermore, according to the embodiment described above, the example is illustrated in which the disk player 11 is used as the transmission apparatus (source apparatus) and the television receiver 12 is used as the reception apparatus (synchronized apparatus), but, of course, even though other transmission apparatuses and reception apparatuses may be used, the present technology can be applied in the same manner.

FIG. 19 illustrates a configuration example of a digital camera 310 as the transmission apparatus (source apparatus). The digital camera 310 has an HDMI terminal 311, an HDMI transmission unit 312, a high-speed bus interface 313, an imager 321, an imager driver 322, an imaging signal processing circuit 323, a camera control CPU 324, a static image signal processing circuit 325, a moving image signal processing circuit 326, a recording and reproducing unit 328, and a memory card 329.

Furthermore, the digital camera 310 has a system control CPU 330, a flash ROM 331, an SDRAM 332, a user operation unit 333, a microphone 334, a voice signal processing circuit 335, a graphic generation circuit 341, a panel drive circuit 336, a display panel 337, a display control unit 342, and a power source unit 343.

The imager 321, for example, is configured from a CMOS imaging element or a CCD imaging element. The imager driver 322 drives the imager 321. The imaging signal processing circuit 323 processes an imaging signal that is obtained in the imager 321, and generates image data (captured image data) corresponding to a photographic subject. The camera control CPU 324 controls operation of each of the imager driver 322 and the imaging signal processing circuit 323. Moreover, in this example, an example is illustrated in which in addition to the system control CPU 330, the camera control CPU 324 is included, but these may be integrated into one chip, and may be a multi-core processor.

The static image signal processing circuit 325 performs compression encoding processing in the Joint Photographic Experts Group (JPEG) standard on image data that is obtained in the imaging signal processing circuit 323 at the time of capturing a static image, and thus generates static image data.

The voice signal processing circuit 335 performs processing such as A/D conversion on a voice signal that is obtained in the microphone 334, and thus obtains voice data corresponding to the captured image data. The moving image signal processing circuit 326 performs processing such as compression encoding in compliance with a recording medium format on the image data that is obtained in the imaging signal processing circuit 323 at the time of capturing a moving image and the voice data that is obtained in the voice signal processing circuit 335 at the time of capturing the moving image, and thus generates a moving image data to which the voice data is added.

The recording and reproducing unit 328 writes the static image data that is generated in the static image signal processing circuit 325 at the time of capturing the static image to the inserted memory card 329, or to the flash ROM 331 through the system control CPU 330. Furthermore, the recording and reproducing unit 328 writes the moving image data that is generated in the moving image signal processing circuit 326 at the time of capturing the moving image to the inserted memory card 329, or to the flash ROM 331 through the system control CPU 330. Moreover, the recording and reproducing unit 328 reads the moving image data from the memory card 329 at the time of reproducing the static image or the moving image, performs decoding processing and the like on the moving image data being read, and thus obtains reproduction image data.

The graphic generation circuit 341 performs superimposing processing of graphic data and the like on the image data that is output from the imaging signal processing circuit 323 or the reproduction image data that is generated in the recording and reproducing unit 328, when necessary. Based on the image data that is output from the graphic generation circuit 341, the panel drive circuit 336 drives the display panel 337 and displays a captured image (the moving image)

or a reproduction image (the static image or the moving image) on the display panel 337. The display control unit 342 controls the graphic generation circuit 341 or the panel drive circuit 336 and thus controls display on the display panel 337. The display panel 337, for example, is configured from a liquid crystal display (LCD) panel, organic electro-luminescence (EL) panel, or the like.

Moreover, in this example, an example is illustrated in which in addition to the system control CPU 330, the display control unit 342 is included, but the system control CPU 330 may directly control the display on the display panel 337. Furthermore, the system control CPU 330 and the display control unit 342 may be integrated into one chip and may be a multi-core processor. The power source unit 343 supplies electric power to each unit of the digital camera 310. The power source unit 343 may be an AC power source or a battery (a storage battery or a dry cell).

The system control CPU 330 controls operation of each of the static image signal processing circuit 325, the moving image signal processing circuit 326, the recording and reproducing unit 328 and the like. The flash ROM 331, the SDRAM 332, and the user operation unit 333 are connected to the system control CPU 330. A program for controlling the system control CPU 330 and the like are stored in the flash ROM 331. Furthermore, the SDRAM 332 is used to store temporarily data necessary for the system control CPU 330 to perform control processing and so forth.

The user operation unit 333 makes up a user interface. Moreover, the user operation unit 333, for example, may be a switch, a wheel, a touch panel unit into which an instruction is input by proximity/touch, a mouse, a keyboard, a gesture input unit that detects inputting of the instruction with a camera, a voice input unit into which the instruction is input through a voice, a remote controller, or the like. The system control CPU 330 determines an operation state of the user operation unit 333 and controls operation of the digital camera 310. The user can perform an operation of inputting various pieces of additional information, and the like in addition to an imaging (recording) operation and a reproducing operation, using the user operation unit 333.

With the communication in compliance with HDMI, the HDMI transmission unit (HDMI source) 312 sends the image (picture) data and the voice data in the baseband from the HDMI terminal 311 to the HDMI cable. The HDMI transmission unit 312 is described in detail below. The high-speed bus interface 313 is an interface for bi-directional communication that uses a predetermined line which makes up the HDMI cable. The high-speed bus interface 313 is inserted between the system control CPU 330 and the HDMI terminal 311.

The high-speed bus interface 313 sends the transmission data that is supplied from the system control CPU 330 from the HDMI terminal 311 to the HDMI cable. Furthermore, the high-speed bus interface 313 supplies the reception data that is received from the other party's apparatus through the HDMI terminal 311 from the HDMI cable to the system control CPU 330.

Operation of the digital camera 310 that is illustrated in FIG. 19 is briefly described. The imaging signal that is obtained in the imager 321 is supplied to the imaging signal processing circuit 323 for processing, and the image data (the captured image data) corresponding to the photographic object is obtained from the imaging signal processing circuit 323. At the time of capturing the static image, in the static image signal processing circuit 325, the compression encoding processing and the like are performed on the image data that is output from the imaging signal processing circuit 323, and thus the static image data is generated. The static image data is stored in the memory card 329 and the like by the recording and reproducing unit 328.

Furthermore, at the time of capturing the moving image, in the moving image signal processing circuit 326, processing such as the compression encoding in compliance with the recording medium format is performed on the image data that is output from the imaging signal processing circuit 323 and the voice data that is output from the voice signal processing circuit 335, and thus the moving image data to which the voice data is added is generated. The moving image data is recorded in the memory card 329 and the like by the recording and reproducing unit 328.

At the time of reproducing the static image, the static image data is read from the memory card 329 and the like, the decoding processing and the like are performed on the static image data being read in the static image signal processing circuit 325, and thus the reproduction image data is obtained. The reproduction image data is supplied to the panel drive circuit 336 through the system control CPU 330 and the moving image signal processing circuit 326, and the static image is displayed on the display panel 337.

At the time of reproducing the moving image, the moving image data is read from the memory card 329 and the like by the recording and reproducing unit 328, and the decoding processing and the like are performed on the moving image data being read in the moving image signal processing circuit 326, and thus the reproduction image data is obtained. Then, the reproduction image data is supplied to the panel drive circuit 336, and the moving image is displayed on the display panel 337.

If the image data and the voice data associated with the static image data or the moving image data that is recorded in the memory card 329 and the like is transmitted to the external apparatus (synchronized apparatus), the static image data or the moving image data is read from the memory card 329 and is supplied to the processing circuits 325 and 326, the decoding processing and the like are performed on the static image data or the moving image data, and the image data and the voice data in the baseband are obtained. Then, the image data and the voice data in the baseband is supplied to the HDMI transmission unit 312, and is sent to the HDMI cable that is connected to the HDMI terminal 311.

Furthermore, if the image data and the voice data associated with the static image data or the moving image data that is output directly from the imaging signal processing circuit 323 and the voice signal processing circuit 335 are transmitted to the external apparatus (synchronized apparatus), the image data and the voice data in the baseband is supplied to the HDMI transmission unit 312 and is sent to the HDMI cable that is connected to the HDMI terminal 311.

Furthermore, according to the embodiment described above, the example is illustrated in which the WCG image data is handled as the image data with the wide color gamut. However, of course, the present technology is not limited to the WCG image data, and can be applied to the transmission apparatus (source apparatus) and the reception apparatus (synchronized apparatus) that handle the same image data with the wide color gamut.

Furthermore, according to the embodiment described above, the example is illustrated in which the image data with the wide color gamut is the WCG image data. However, of course, the present technology can be applied in the same manner to the source apparatus and the synchronized apparatus that handle other items of image data with the wide color gamut.

Furthermore, the present technology can be configured as follows.

(1) A transmission apparatus comprising:
circuitry configured to
transmit image data with a wide color gamut to an external apparatus over a transmission path; and
transmit to the external apparatus over the transmission path additional information regarding the image data and information regarding a transmission method of the additional information.

(2) The transmission apparatus according to (1), wherein the circuitry is configured to transmit the image data with the Wide Color Gamut over the transmission path using a differential signal.

(3) The transmission apparatus according to (2), wherein the circuitry is configured to
insert information on the transmission method during a blanking period in which image data is not transmitted, and
transmit to the external apparatus the information that was inserted.

(4) The transmission apparatus according to (2), wherein the circuitry is configured to
insert the additional information regarding the image data with the Wide Color Gamut during a blanking period in which the image data is not being transmitted, and
transmit to the external apparatus the additional information that was inserted.

(5) The transmission apparatus according to (2), wherein the circuitry is configured to transmit the additional information regarding the image data to the external apparatus over a bidirectional communication path that includes a communication line of the transmission path.

(6) The transmission apparatus according to (5), wherein the bidirectional communication path is a pair of differential transmission paths, and at least one of the pair of differential transmission paths is configured to receive a connection state notification from the external apparatus using direct-current bias potential.

(7) The transmission apparatus according to (1), wherein the additional information regarding the image data with the Wide Color Gamut includes at least one of luminance level information on a white chromaticity point of the image data with the Wide Color Gamut, a vector value of the white chromaticity point in an XYZ coordinate system, a vector value of a RGB chromaticity point in the XYZ coordinate system, and vector values of one or more chromaticity points that lie out of RGB, in the XYZ coordinate system.

(8) The transmission apparatus according to (1), further comprising: a receiver configured to receive the information on the transmission method for the additional information on the image data from the external apparatus over the transmission path, wherein
the circuitry is configured to
select the transmission method from among a plurality of transmission methods that the external apparatus is able to support, based on the information received by the receiver, and
transmit the additional information over the transmission path using the transmission method selected by the circuitry.

(9) The transmission apparatus according to (1), wherein the wide color gamut is a wider gamut than for sRGB.

(10) A method of transmitting image data with a Wide Color Gamut, comprising:
transmitting with a transmitter the image data with the Wide Color Gamut to an external apparatus over a transmission path; and
transmitting via the transmitter additional information regarding the image data and information regarding a transmission method of the additional information.

(11) A non-transitory computer readable medium having instructions stored therein that when executed by a computer cause the computer to implement an apparatus comprising:
circuitry configured to
transmit image data with a Wide Color Gamut to an external apparatus over a transmission path; and
transmit over the transmission path additional information regarding the image data and information regarding a transmission method of the additional apparatus.

(12) A reception apparatus comprising:
circuitry configured to
receive from an external apparatus over a transmission path image data with a wide color gamut to be displayed as an image with the wide color gamut, and
receive additional information regarding the image data with the wide color gamut and information regarding a transmission method of the additional information; and a data processor that processes the image data with the wide color gamut using the additional information on the image data with the wide color gamut.

(13) The reception apparatus according to (12), wherein the circuitry is configured to receive the image data with the wide color gamut over the transmission path using a differential signal.

(14) The reception apparatus according to (13), wherein the circuitry is configured to extract the information on the transmission method during a blanking period in which the image data is not being transmitted.

(15) The reception apparatus according to (13), wherein the receiver is configured to extract the additional information on the image data during a blanking period in which the image data is not being transmitted.

(16) The reception apparatus according to (13), wherein the circuitry is configured to receive the additional information on the image data with the wide color gamut over a bidirectional communication path that includes a communication line of the transmission path.

(17) The transmission apparatus according to (17), wherein the bidirectional communication path is a pair of differential transmission paths, and at least one of the pair of differential transmission paths is configured to notify the external apparatus of a connection state using direct-current bias potential.

(18) The reception apparatus according to (12), further comprising: a non-transitory storage medium in which the information on the transmission method that the circuitry is able to support is stored; and a transmitter that transmits the information on the transmission method that is stored in the storage medium to the external apparatus over the transmission path.

(19) The reception apparatus according to (18), wherein the information on the transmission method is at least one of GBD packet information, VSIF packet information, AVIF packet information, and HEC packet information.

(20) The reception apparatus according to (12), wherein the wider color gamut is a wider gamut than for a sRGB.

(21) A method of receiving image data with a Wide Color Gamut, comprising:
receiving with circuitry the image data with the wide color gamut over a transmission path; and
receiving with the circuitry
additional information regarding the image data and information regarding a transmission method of the additional information; and processing with the circuitry the image data with the wide color gamut that is received by the circuitry using the additional information on the image data with the wide color gamut.

(22) A non-transitory storage medium having instructions stored therein that when executed by a computer cause the computer to implement an apparatus comprising:
  circuitry configured to
  receive over a transmission path image data with a wide color gamut for displaying an image with the wide color gamut,
  receive additional information regarding the image data and information regarding a transmission method of the additional information; and
  a data processor that processes the image data with the wide color gamut using the additional information on the image data with the wide color gamut.

(A01) A transmission apparatus including: a data transmission unit that transmits image data with a wide color gamut to an external apparatus over a transmission path; and an information transmission unit that transmits additional information on the image data with the wide color gamut that is transmitted by the data transmission unit and information on a transmission method for the additional information, to the external apparatus over the transmission path.

(A02) The transmission apparatus according to (A01), in which the data transmission unit transmits the image data with the wide color gamut to the external apparatus over the transmission path using a differential signal.

(A03) The transmission apparatus according to (A02), in which the information transmission unit inserts the information on the transmission method for the additional information on the image data with the wide color gamut that is transmitted from the data transmission unit, during a blanking period of the image data with the wide color gamut, and transmits the inserted information to the external apparatus.

(A04) The transmission apparatus according to (A02) or (A03), in which the information transmission unit inserts the additional information on the image data with the wide color gamut that is transmitted from the data transmission unit, during a blanking period of the image data with the wide color gamut, and thus transmits the inserted additional information to the external apparatus.

(A05) The transmission apparatus according to (A02) or (A03), in which the information transmission unit transmits the additional information on the image data with the wide color gamut that is transmitted from the data transmission unit, to the external apparatus over a bidirectional communication path that is configured from a predetermined line of the transmission path.

(A06) The transmission apparatus according to (A05), in which the bidirectional communication path is a pair of differential transmission paths, and at least one of the differential transmission paths in the pair has a function of receiving a connection state notification from the external apparatus using direct-current bias potential.

(A07) The transmission apparatus according to any one of (A01) to (A06), in which the additional information on the image data with the wide color gamut includes at least one among luminance level information on a white chromaticity point of the image data with the wide color gamut, a vector value of the white chromaticity point in an XYZ coordinate system, a vector value of an RGB chromaticity point in the XYZ coordinate system, and vector values of one or more chromaticity points that lie out of RGB, in the XYZ coordinate system.

(A08) The transmission apparatus according to any one of (A01) to (A07), further including: a transmission method information reception unit that receives the information on the transmission method for the additional information on the image data with the wide color gamut that is transmitted by the external apparatus over the transmission path and that the external apparatus is able to support; and a transmission method selection unit that selects a predetermined transmission method from among the transmission methods for the additional information on the image data with the wide color gamut that the external apparatus is able to support, based on the information on the transmission method that is received by the transmission method information reception unit, in which the information transmission unit transmits the additional information on the image data with the wide color gamut over the transmission path using the transmission method that is selected by the transmission method selection unit.

(A09) A method of transmitting image data with a wide color gamut, including: causing a data transmission unit to transmit the image data with the wide color gamut to an external apparatus over a transmission path; and
transmitting additional information on the image data with the wide color gamut that is transmitted in the causing and information on a transmission method for the additional information to the external apparatus over the transmission path.

(A10) A program for causing a computer to function as: a data transmission section that transmits image data with a wide color gamut to an external apparatus over a transmission path; and
an information transmission section that transmits additional information on the image data with the wide color gamut that is transmitted by the data transmission unit and information on a transmission method for the additional information, to the external apparatus over the transmission path.

(A11) A reception apparatus including: a data reception unit that receives image data with a wide color gamut for displaying an image with the wide color gamut from an external apparatus over a transmission path; an information reception unit that receives information on a transmission method for additional information on the image data with the wide color gamut that is received by the data reception unit, and that receives the additional information on the image data with the wide color gamut based on the information on the transmission method from the external apparatus; and a data processing unit that processes the image data with the wide color gamut, using the additional information on the image data with the wide color gamut that is received by the data reception unit.

(A12) The reception apparatus according to (A11), in which the data reception unit receives the image data with the wide color gamut from the external apparatus over the transmission path using a differential signal.

(A13) The reception apparatus according to (A12), in which the information reception unit extracts the information on the transmission method for the additional information on the image data with the wide color gamut from a blanking period of the image data with the wide color gamut that is received by the data reception unit.

(A14) The reception apparatus according to (A12) or (A13), in which the information reception unit extracts the additional information on the image data with the wide color gamut from a blanking period of the image data with the wide color gamut that is received by the data reception unit.

(A15) The reception apparatus according to (A12) or (A13), in which the information reception unit receives the additional information on the image data with the wide color gamut that is received by the data reception unit, from the external apparatus over a bidirectional communication path that is configured from a predetermined line of the transmission path.

(A16) The transmission apparatus according to (A15), in which the bidirectional communication path is a pair of differential transmission paths, and at least one of the differential transmission paths in the pair has a function of notifying the external apparatus of a connection state using direct-current bias potential.

(A17) The reception apparatus according to any one of (A11) to (A16), further including: a transmission method information storage unit in which the information on the transmission method for the additional information on the image data with the wide color gamut that the reception apparatus itself is able to support is stored; and a transmission method information transmission unit that transmits the information on the transmission method that is stored in the transmission method information storage unit to the external apparatus over the transmission path.

(A18) The reception apparatus according to (A17), in which the information on the transmission method that is stored in the transmission method information storage unit is at least one among GBD packet information, VSIF packet information, AVIF packet information, and HEC packet information.

(A19) A method of receiving image data with a wide color gamut, including: causing a data reception unit to receive the image data with the wide color gamut from an external apparatus over a transmission path; and receiving information on a transmission method for additional information on the image data that is received in the causing, and receiving the additional information on the image data with the wide color gamut based on the information on the transmission method from the external apparatus; and processing the image data with the wide color gamut that is received in the causing, using the additional information on the image data with the wide color gamut that is receiving in the receiving.

(A20) A program for causing a computer to function as: a data reception section that receives image data with a wide color gamut for displaying an image with the wide color gamut from an external apparatus over a transmission path; an information reception section that receives information on a transmission method for additional information on the image data with the wide color gamut that is received by the data reception unit, and that receives the additional information on the image data with the wide color gamut based on the information on the transmission method from the external apparatus; and a data processing section that processes the image data with the wide color gamut that is received by the data reception unit, using the additional information on the image data with the wide color gamut.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST

10 AV SYSTEM
11 DISK PLAYER
11a HDMI TERMINAL
11b HDMI TRANSMISSION UNIT
11c HIGH-SPEED BUS INTERFACE
12 TELEVISION RECEIVER
12a HDMI TERMINAL
12b HDMI RECEPTION UNIT
12c HIGH-SPEED BUS INTERFACE
13 HDMI CABLE
14 EFFECTIVE IMAGE PERIOD
15 HORIZONTAL BLANKING PERIOD
16 VERTICAL BLANKING PERIOD
17 VIDEO DATA PERIOD
18 DATA ISLAND PERIOD
19 CONTROL PERIOD
21 HDMI TRANSMITTER
22 HDMI RECEIVER
23 DDC LINE
24 CEC LINE
25 HPD LINE
26 POWER SOURCE LINE
27 RESERVE LINE
104 CPU
105 INTERNAL BUS
106 FLASH ROM
107 SDRAM
108 REMOTE CONTROL RECEPTION UNIT
109 REMOTE CONTROL TRANSMISSION UNIT
110 SATA INTERFACE
111 BD DRIVE
112 ETHERNET INTERFACE
113 NETWORK TERMINAL
114 MPEG DECODER
115 GRAPHICS GENERATION CIRCUIT
116 PICTURE OUTPUT TERMINAL
117 VOICE OUTPUT TERMINAL
121 DISPLAY CONTROL UNIT
122 PANEL DRIVE CIRCUIT
123 DISPLAY PANEL
124 POWER SOURCE UNIT
205 ANTENNA TERMINAL
206 DIGITAL TUNER
207 MPEG DECODER
208 PICTURE SIGNAL PROCESSING CIRCUIT
209 GRAPHICS GENERATION CIRCUIT
210 PANEL DRIVE CIRCUIT
211 DISPLAY PANEL
212 VOICE SIGNAL PROCESSING CIRCUIT
213 VOICE AMPLIFICATION CIRCUIT
214 SPEAKER
220 INTERNAL BUS
221 CPU
222 FLASH ROM
223 DRAM
224 ETHERNET INTERFACE
225 NETWORK TERMINAL
226 REMOTE CONTROL RECEPTION UNIT
227 REMOTE TRANSMISSION UNIT
231 DISPLAY CONTROL UNIT
232 POWER SOURCE UNIT
300 DP SYSTEM
301 DP TRANSMITTER
302 DP TRANSMISSION UNIT
303 DP CABLE
304 MAIN LINK
305 AUX CHANNEL
306 HOT PLUG DETECTION LINE
307 DP RECEIVER

308 DP RECEPTION UNIT
309 STORAGE UNIT
400 MHL SYSTEM
401 MHL TRANSMITTER
402 TMDS TRANSMISSION UNIT
403 STORAGE UNIT
404 MHL CABLE
405 TMDS CHANNEL
406 eCBUS LINE
407 VBUS LINE
408 MHL RECEIVER
409 TMDS RECEPTION UNIT
410 STORAGE UNIT
411 EDID ROM

The invention claimed is:

1. A transmission apparatus, comprising:
 circuitry configured to:
  receive, from an external apparatus via a transmission path, first information associated with a plurality of transmission methods supported by the external apparatus;
  select a transmission method from the plurality of transmission methods, based on the received first information and data transmission speeds associated with the plurality of transmission methods;
  transmit image data to the external apparatus via the transmission path,
   wherein the image data is associated with a wide color gamut; and
  transmit, to the external apparatus via the transmission path, second information associated with the image data and third information associated with the selected transmission method of the second information.

2. The transmission apparatus according to claim 1, wherein the circuitry is further configured to transmit the image data based on a differential signal.

3. The transmission apparatus according to claim 2, wherein the circuitry is further configured to:
 transmit the third information associated with the transmission method in a blanking period corresponding to the transmission of the image data,
  wherein the image data is transmitted only in a first period different from the blanking period.

4. The transmission apparatus according to claim 2, wherein the circuitry is further configured to:
 insert the second information associated with the image data in a blanking period corresponding to the transmission of the image data,
  wherein the image data is transmitted only in a period different from the blanking period; and
 transmit the inserted second information to the external apparatus.

5. The transmission apparatus according to claim 2, wherein the circuitry is further configured to transmit the second information associated with the image data to the external apparatus via a bidirectional communication path, and
 wherein the bidirectional communication path includes a communication line of the transmission path.

6. The transmission apparatus according to claim 5, wherein the bidirectional communication path is a pair of differential transmission paths, and
 wherein at least one of the pair of differential transmission paths is configured to receive a connection state notification from the external apparatus based on a direct-current bias potential.

7. The transmission apparatus according to claim 1, wherein the second information includes at least one of luminance level information associated with a white chromaticity point of the image data, a first vector value of the white chromaticity point in an XYZ coordinate system, a second vector value of a RGB chromaticity point in the XYZ coordinate system, or third vector values of at least one chromaticity point that lie out of RGB, in the XYZ coordinate system.

8. The transmission apparatus according to claim 1, wherein the wide color gamut is a wider gamut than a first gamut corresponding to sRGB.

9. A method, comprising:
 receiving, from an external apparatus via a transmission path, first information associated with a plurality of transmission methods supported by the external apparatus;
 selecting a transmission method from the plurality of transmission methods, based on the received first information and data transmission speeds associated with the plurality of transmission methods;
 transmitting, by a transmitter, image data to the external apparatus via the transmission path,
  wherein the image data is associated a wide color gamut; and
 transmitting, to the external apparatus by the transmitter, second information associated with the image data and third information associated with the selected transmission method of the second information.

10. A non-transitory computer-readable medium having stored thereon, computer-executable instructions which, when executed by a computer, cause the computer to execute operations, the operations comprising:
 receiving, from an external apparatus via a transmission path, first information associated with a plurality of transmission methods supported by the external apparatus;
 selecting a transmission method from the plurality of transmission methods, based on the received first information and data transmission speeds associated with the plurality of transmission methods;
 transmitting image data associated with a wide color gamut to the external apparatus,
  wherein the image data is transmitted via the transmission path; and
 transmitting, to the external apparatus via the transmission path, second information associated with the image data and third information associated with the selected transmission method of the second information.

11. A reception apparatus, comprising:
 circuitry configured to:
  transmit, to an external apparatus via a transmission path, first information associated with a plurality of transmission methods supported by the reception apparatus;
  receive, from an external apparatus via a transmission path, image data that is displayed as an image,
   wherein the image data is associated with a wide color gamut,
  receive second information associated with the image data and third information associated with a transmission method of the second information,
   wherein the external apparatus selects the transmission method from the plurality of transmission methods based on the transmitted first information and data transmission speeds associated with the plurality of transmission methods; and process the image data based on the received second information.

12. The reception apparatus according to claim 11, wherein the circuitry is further configured to receive the image data via the transmission path based on a differential signal.

13. The reception apparatus according to claim 12, wherein the circuitry is further configured to extract the third information associated with the transmission method in a blanking period corresponding to the transmission of the image data,
wherein the image data is transmitted only in a first period that is different from the blanking period.

14. The reception apparatus according to claim 12, wherein the circuitry is further configured to extract the second information associated with the image data in a blanking period corresponding to the transmission of the image data,
wherein the image data is transmitted only in a first period that is different from the blanking period.

15. The reception apparatus according to claim 12,
wherein the circuitry is further configured to receive the second information associated with the image data, via a bidirectional communication path, and
wherein the bidirectional communication path includes a communication line of the transmission path.

16. The reception apparatus according to claim 15, wherein the bidirectional communication path is a pair of differential transmission paths,
wherein at least one of the pair of differential transmission paths is configured to notify the external apparatus of a connection state, based on a direct-current bias potential.

17. The reception apparatus according to claim 11, wherein the circuitry is further configured to;
store the third information associated with the selected transmission method; and
transmit, via the transmission path, the stored third information associated with the selected transmission method to the external apparatus.

18. The reception apparatus according to claim 17, wherein the third information associated with the selected transmission method is at least one of GBD packet information, VSIF packet information, AVIF packet information, or HEC packet information.

19. The reception apparatus according to claim 11, wherein the wide color gamut is a wider gamut than a first gamut corresponding to sRGB.

20. A method, comprising:
in a reception apparatus:
transmitting, to an external apparatus via a transmission path, first information associated with a plurality of transmission methods supported by the reception apparatus;
receiving, via circuitry, image data associated with a wide color gamut via a transmission path; and
receiving, via the circuitry, second information associated with the image data and third information associated with a transmission method of the second information,
wherein the external apparatus selects the transmission method from the plurality of transmission methods, based on the transmitted first information and data transmission speeds associated with the plurality of transmission methods; and
processing, via the circuitry, the received image data based on the received second information associated with the image data.

21. A non-transitory computer-readable medium having stored thereon, computer-executable instructions which, when executed by a reception apparatus, cause the reception apparatus to execute operations, the operations comprising:
transmitting, to an external apparatus via a transmission path, first information associated with a plurality of transmission methods that are supported by the reception apparatus;
receiving, via a transmission path, image data associated with a wide color gamut for displaying an image with the wide color gamut;
receiving second information associated with the image data and third information associated with a transmission method of the second information from the plurality of transmission method,
wherein the external apparatus selects the transmission method from the plurality of transmission methods, based on the transmitted first information and data transmission speeds associated with the plurality of transmission methods; and
processing the image data associated with the wide color gamut based on the second information.

* * * * *